(12) United States Patent
Kendapadi et al.

(10) Patent No.: US 12,400,221 B1
(45) Date of Patent: Aug. 26, 2025

(54) SYSTEMS AND METHODS FOR TRACKING NFT-BACKED INSTRUMENTS

(71) Applicant: Wells Fargo Bank, N.A., San Francisco, CA (US)

(72) Inventors: Ananth Kendapadi, Charlotte, NC (US); Maxwell Williams, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 216 days.

(21) Appl. No.: 18/151,035

(22) Filed: Jan. 6, 2023

(51) Int. Cl.
*G06Q 20/38* (2012.01)
*G06Q 20/40* (2012.01)
*H04L 9/00* (2022.01)
*H04L 9/32* (2006.01)

(52) U.S. Cl.
CPC ... *G06Q 20/38215* (2013.01); *G06Q 20/4016* (2013.01); *H04L 9/3213* (2013.01); *H04L 9/50* (2022.05); *G06Q 2220/00* (2013.01)

(58) Field of Classification Search
None
See application file for complete search history.

(56) References Cited

U.S. PATENT DOCUMENTS

| | | | | |
|---|---|---|---|---|
| 10,140,470 | B2 | 11/2018 | Kurian et al. | |
| 10,540,654 | B1 * | 1/2020 | James | G06Q 20/223 |
| 11,200,569 | B1 * | 12/2021 | James | G06Q 20/381 |
| 11,206,138 | B2 * | 12/2021 | Canterbury | G06F 21/602 |

(Continued)

FOREIGN PATENT DOCUMENTS

| | | | | |
|---|---|---|---|---|
| AU | 2020351764 A1 * | 4/2022 | | G06F 16/2365 |
| WO | WO 2020/014551 A1 * | 1/2020 | | G06F 16/9024 |

(Continued)

OTHER PUBLICATIONS

* Technical Line. "Accounting for digital assets, including crypto assets." (Jun. 30, 2022) . Retrieved online Oct. 23, 2024. https://www.ey.com/content/dam/ey-unified-site/ey-com/en-us/technical/accountinglink/documents/ey-tl 16494-221us-06-30-2022.pdf (Year 2022).*

(Continued)

*Primary Examiner* — James A Reagan
(74) *Attorney, Agent, or Firm* — K&L Gates LLP

(57) ABSTRACT

Systems, apparatuses, methods, and computer program products are disclosed for tracking NFT-backed instruments. An example method includes identifying a plurality of NFTs on a distributed blockchain ledger, associating an instrument with the cryptographic NFTs, determining a value of the cryptographic NFTs based on transactions on the distributed blockchain ledger that are associated with one or more of the cryptographic NFTs, monitoring the distributed blockchain ledger to detect transaction data of a block of the distributed blockchain ledger, the transaction data indicative of a transaction associated with a first cryptographic NFT of the cryptographic NFTs, determining a modified value of the cryptographic NFTs responsive to the transaction data, and terminating the instrument associated with the cryptographic NFTs in response to a comparison of the modified value to a predetermined threshold value indicating that the modified value is less than the predetermined threshold value.

15 Claims, 8 Drawing Sheets

(56) References Cited

U.S. PATENT DOCUMENTS

| | | | | |
|---|---|---|---|---|
| 11,334,883 | B1* | 5/2022 | Auerbach | G06Q 20/223 |
| 11,382,570 | B1* | 7/2022 | Singh | A61B 5/7292 |
| 11,501,297 | B1* | 11/2022 | Tai | H04L 9/50 |
| 11,652,605 | B2* | 5/2023 | Turner | H04L 9/3263 |
| | | | | 380/37 |
| 11,768,471 | B1* | 9/2023 | Knock | G06Q 20/3827 |
| | | | | 386/223 |
| 11,893,626 | B2* | 2/2024 | Youb | G06F 16/1805 |
| 11,985,253 | B2* | 5/2024 | Milam | H04L 63/12 |
| 12,062,037 | B1* | 8/2024 | Coventry | H04L 9/0825 |
| 2016/0104502 | A1* | 4/2016 | Edelstein | G11C 13/0004 |
| | | | | 369/13.05 |
| 2020/0042989 | A1* | 2/2020 | Ramadoss | G06Q 50/167 |
| 2020/0394652 | A1* | 12/2020 | Youb | G06Q 50/16 |
| 2021/0065293 | A1* | 3/2021 | Sigler | G06Q 20/24 |
| 2021/0082044 | A1* | 3/2021 | Sliwka | H04L 9/3255 |
| 2021/0150626 | A1* | 5/2021 | Robotham | H04L 9/3218 |
| 2021/0233067 | A1* | 7/2021 | Crumb | G06Q 50/02 |
| 2021/0319433 | A1* | 10/2021 | Yantis | G06Q 20/387 |
| 2022/0040557 | A1* | 2/2022 | Tran | G06F 1/163 |
| 2022/0069996 | A1* | 3/2022 | Xue | H04L 9/3297 |
| 2022/0230240 | A1* | 7/2022 | Sliwka | G06Q 40/02 |
| 2022/0261882 | A1* | 8/2022 | Youb | G06Q 50/16 |
| 2022/0351195 | A1* | 11/2022 | Quigley | H04L 9/50 |
| 2022/0358547 | A1* | 11/2022 | Blaikie, III | G06Q 30/0269 |
| 2023/0006976 | A1* | 1/2023 | Jakobsson | H04L 9/50 |
| 2023/0043095 | A1* | 2/2023 | Milam | H04L 9/3247 |
| 2023/0043702 | A1* | 2/2023 | Sells | G06Q 40/03 |
| 2023/0075767 | A1* | 3/2023 | Bradley | G06Q 30/0234 |
| 2023/0116401 | A1* | 4/2023 | Nichani | G06Q 20/123 |
| | | | | 705/36 R |
| 2023/0120897 | A1* | 4/2023 | Kozlowski, III | H04L 9/32 |
| | | | | 705/75 |
| 2023/0141471 | A1* | 5/2023 | Baker | G06N 5/01 |
| | | | | 707/715 |
| 2023/0237408 | A1* | 7/2023 | Saigh | G06Q 40/04 |
| | | | | 705/7.36 |
| 2023/0334490 | A1* | 10/2023 | Tai | H04L 9/50 |
| 2023/0351341 | A1* | 11/2023 | Lyren | G06Q 30/06 |
| 2024/0037620 | A1* | 2/2024 | Fetman | G06Q 30/0609 |
| 2024/0296493 | A1* | 9/2024 | Youb | H04L 9/0643 |
| 2024/0386489 | A1* | 11/2024 | Eutsler | G06Q 20/3825 |

FOREIGN PATENT DOCUMENTS

| | | | | |
|---|---|---|---|---|
| WO | WO-2021062160 A1 * | 4/2021 | | G06F 16/2365 |
| WO | WO-2022178096 A1 * | 8/2022 | | G06Q 20/065 |

OTHER PUBLICATIONS

• PWC. "Crypto Assets." (Nov. 2022). Retrieved online Oct. 23, 2024. https://viewpoint.pwc.com/dt/us/en/pwc/accounting_guides/crypto-assets-guide/assets/pwccryptoassetsguide1122.pdf (Year: 2022).*

• Technical Line. "Accounting for digital assets, including crypto assets." (Jun. 30, 2022). Retrieved online Oct. 23, 2024. https://www.ey.com/content/dam/ey-unified-site/ey-com/en-su/technical/accountinglink/documents/ey-tl 16494-221us-06-30-2022.pdf (Year: 2022).*

• Binance. "What Is Rebalancing Bot and Frequently Asked Questions." (Jan. 4, 2023). Retrieved online Feb. 24, 2025. https://www.binance.com/en/support/faq/detail/29bbbd2e7fc24085be7a8a7d02779457 (Year: 2023)*

* cited by examiner

SYSTEMS AND METHODS FOR TRACKING NFT-BACKED INSTRUMENTS

BACKGROUND

Securitized products are pools of financial instruments that produce cash flows. The financial instruments may be debt instruments like mortgages, auto loans, student loans, and credit card receivables. This process of combining the financial instruments to produce debt securities to be resold to investors is called securitization. Securitized products can provide fixed income investors with an alternative to corporate, government or municipal bonds with the potential for greater diversification and higher yields. A common example of a securitized product is a mortgage-backed security, which is secured by home or other real estate loans. Other securitized products include asset-backed securities, which are bonds created from other types of consumer debt or commercial receivables.

A collateralized debt obligation (CDO) is a financial product made by pooling large sets of debt and then slicing the pool into tranches that receive interest at varying rates inversely related to the order of seniority of the tranches (an AAA tranche pays a low interest rate but is unlikely to default, while a BBB tranche pays a higher interest rate, but carries the earlier risk of loss if there are defaults in the underlying debt obligations). In doing so, investors with a variety of risk appetites may utilize a CDO to achieve their desired risk and interest rate targets.

BRIEF SUMMARY

The sale prices of non-fungible tokens (NFTs) fluctuate wildly and, therefore, individual NFTs are generally not favored as an asset class to investors who are more conservative. Moreover, ownership of an NFT typically does not provide free cash flow to fund a fixed interest return. As a result, it may be difficult in conventional markets to provide investment platforms that facilitate NFT investment and/or to securitize NFTs.

In contrast to these conventional techniques for securitizing financial instruments, example embodiments described herein utilize blockchain technology to securitize NFTs to provide technology support of NFT investment. To do this, embodiments according to the present disclosure may create tranches from subsets of NFTs and record and/or track each transfer of ownership of the NFTs of each subset to estimate a holistic value of that subset. The estimated value of each subset of the NFTs may be utilized to provide data structures representing financial instruments that track the subset of the NFTs. Using NFT technology rather than legacy tools for such investment tracking allows for valuation of the subset to be automatically performed. In some embodiments, the subsets of the NFTs themselves may be represented on the blockchain, allowing for details of the subset and/or financial transactions associated with it to be transparently visible on the blockchain in immutable form.

Transitioning from ad hoc legacy modes of operation to an NFT-based approach also provides an opportunity for standardization of the protocol for the management of the associated financial instruments. For example, since the interfaces to create NFTs are known and standardized, the underlying structure of the instrument associated with the NFTs can also be standardized, allowing for easier searching and management. Furthermore, an NFT-based approach enables better regulatory oversight and assists in providing clarity about the allocation of risk within the instrument associated with the NFTs. Moreover, enabling automatic valuation of pooled NFT assets in near-real-time is of heightened importance for management of NFT investments, because NFTs themselves can be transacted more quickly than the legacy assets that are traditionally the subject of securitization. Accordingly, example embodiments provide a technological platform facilitating NFT-based securitization and valuation that would not be possible using legacy securitization processes. Accordingly, the present disclosure sets forth systems, methods, and apparatuses that improve the management of financial instruments and accommodate financial instruments associated with digital structures on a blockchain.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

Having described certain example embodiments in general terms above, reference will now be made to the accompanying drawings, which are not necessarily drawn to scale. Some embodiments may include fewer or more components than those shown in the figures.

DETAILED DESCRIPTION

Figure 1:
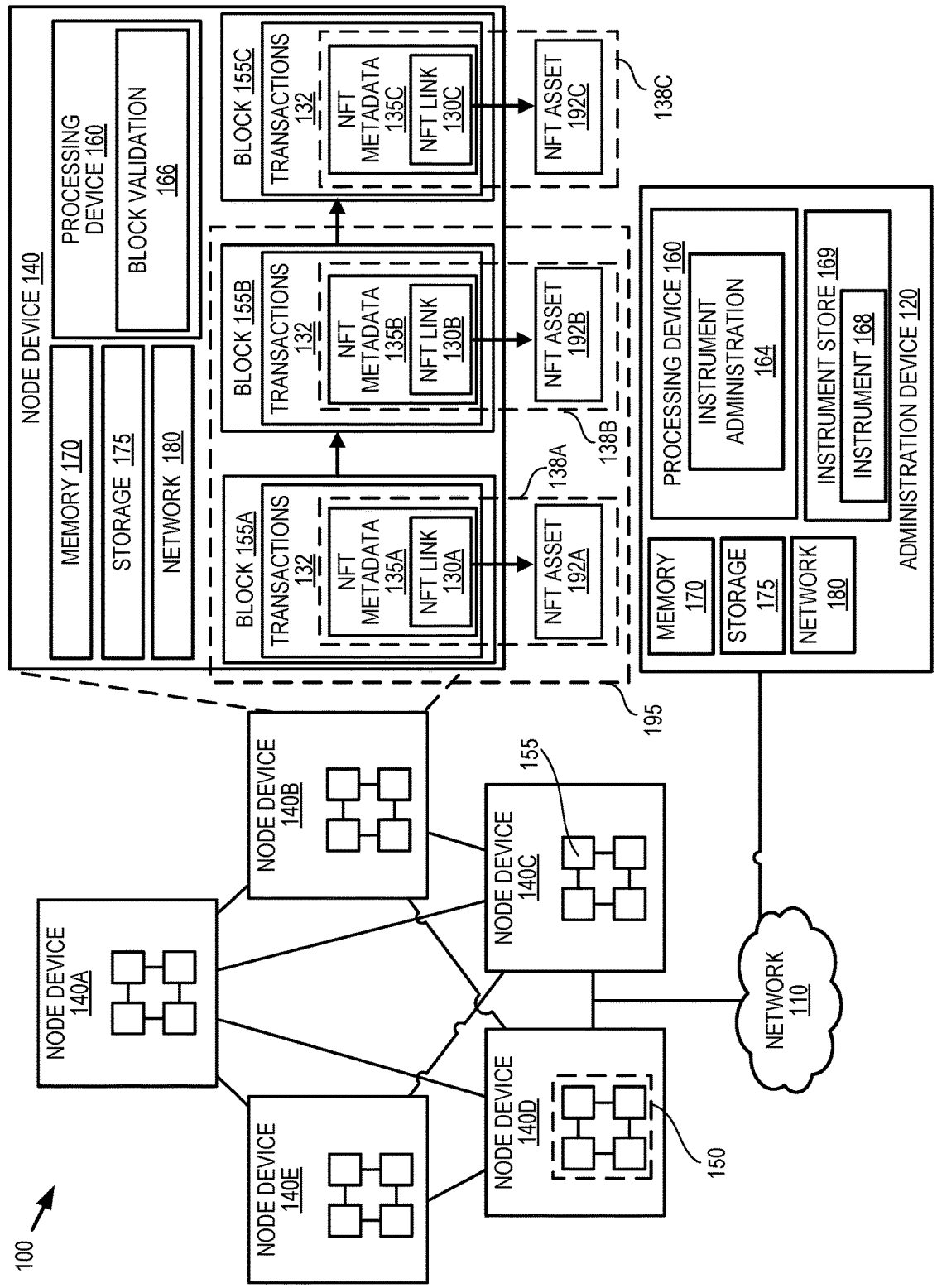
FIG. 1 depicts a high-level component diagram of an illustrative example of a system architecture, in accordance with one or more aspects of the present disclosure.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server.

The term "tranche" refers to a financial instrument backed by a segment of a pool of assets, such as NFTs. Multiple tranches may be defined for a pool of NFTs, with different ones of the tranches offering different levels of risk, maturity, or cashflow with respect to the pool. A tranche may include an attachment and a detachment point. The attachment point indicates the minimum of pool-level losses at which a given tranche begins to suffer losses. The detachment point corresponds to the amount of pool losses that completely wipe out the tranche. The riskiness of a tranche may decrease with the seniority of the tranche in the securitization of the pool. A junior tranche, for example, could have attachment and detachment points equal to 0% and 10%, respectively, of the pool exposure. Such a tranche would be intact if there are no losses but would be partly eroded with the first losses. The erosion will be complete when losses reach 10% of the pool exposure. By contrast, a mezzanine tranche with attachment and detachment points of 10% and 20%, respectively, is initially protected but would be affected as soon as losses exceed 10% of the pool size. Finally, a senior tranche with attachment and detachment points of 20% and 100% respectively will be the most protected, starting to incur losses only when both the junior and mezzanine tranches are wiped out.

The term "blockchain" refers to a digital database and/or ledger that is distributed among nodes (also referred to as node devices or node computing devices) of a peer-to-peer network. In some embodiments, each of the nodes of the peer-to-peer network maintain a copy of the blockchain. The blockchain may be formed of interconnected blocks, which may represent, for example, elements of the blockchain and/or transactions associated with the elements of the blockchain. Each block contains a timestamp, transaction data, and a cryptographic hash of the previous block, forming the blockchain.

The term "NFT" refers to a non-fungible token that is incorporated within blockchain. The NFT has a unique digital identifier that cannot be copied and/or substituted which may be used to certify authenticity and ownership. Transactions posted to the blockchain may record and/or change ownership of the NFT. NFTs on a blockchain may be linked to other blocks in the blockchain via a cryptographic hash, and thus may be referred to herein as a cryptographic NFT.

As used herein, the term "and/or" includes any and all combinations of one or more of the associated listed items.

System Architecture

Example embodiments described herein may be implemented using any of a variety of computing devices or servers. To this end, FIG. 1 depicts a high-level component diagram of an illustrative example of a system architecture 100, in accordance with one or more aspects of the present disclosure. The system architecture 100 includes one or more administration computing devices 120 (also referred to herein as an administration device), one or more node computing devices 140 (also referred to herein as a node device).

The administration device 120 and the node device(s) 140 may include one or more processing devices 160, memory 170, which may include volatile memory devices (e.g., random access memory (RAM)), non-volatile memory devices (e.g., flash memory) and/or other types of memory devices, storage devices 175 (which may, in some embodiments, be part of memory 170) and one or more network interfaces 180 (also referred to herein as network hardware 180). In certain implementations, memory 170 may be non-uniform access (NUMA), such that memory access time depends on the memory location relative to processing device 160. It should be noted that although, for simplicity, a single processing device 160 is depicted in each of the administration device 120 and the node device(s) 140 depicted in FIG. 1, other embodiments of the administration device 120 and the node device(s) 140 may include multiple processing devices, storage devices, or other devices. FIG. 1 and the other figures may use like reference numerals to identify like elements. A letter after a reference numeral, such as "140A," indicates that the text refers specifically to the element having that particular reference numeral. A reference numeral in the text without a following letter, such as "140," refers to any or all of the elements in the figures bearing that reference numeral.

Processing device 160 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 160 may also include one or more special-purpose processing devices such as an application specific integrated circuit (ASIC), a field programmable gate array (FPGA), a digital signal processor (DSP), network processor, or the like. Different ones of the administration device 120 and the node device(s) 140 may have different types of processing device 160.

Storage device 175 may comprise a distinct component from the administration device 120 and/or the node devices (s) 140, or may comprise an element of administration device 120 and/or node devices(s) 140 (e.g., memory 170). Storage device 175 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., network 110). Storage device 175 may host the software executed to operate the administration device 120 and/or the node devices(s) 140. Storage device 175 may store information relied upon during operation of the administration device 120 and/or the node devices(s) 140, such as various computer instructions that may be used by the administration device 120 and/or the node devices(s) 140, data and documents to be analyzed using the administration device 120 and/or the node devices(s) 140, or the like. In addition, storage device 175 may store control signals, device characteristics, and access credentials enabling interaction between the administration device 120 and/or the node devices(s) 140.

The storage devices 175 may be embodied by any storage devices known in the art. Similarly, the administration device 120 and/or node devices(s) 140 may be embodied by any computing devices known in the art, such as desktop or laptop computers, tablet devices, smartphones, or the like. The one or more administration device 120 and/or node devices(s) 140 need not themselves be independent devices, but may be peripheral devices communicatively coupled to other computing devices.

In some embodiments, the administration device 120 and/or the node device(s) 140 may be directly or indirectly communicatively coupled through one or more of the network interfaces 180. For example, the administration device 120 and/or the node device(s) 140 may be coupled to each other (e.g., may be operatively coupled, communicatively coupled, may communicate data/messages with each other) via network 110. Network 110 may be a public network (e.g., the internet), a private network (e.g., a local area network (LAN) or wide area network (WAN)), or a combination thereof. In one embodiment, network 110 may include a wired or a wireless infrastructure, which may be provided by one or more wireless communications systems, such as a WIFI® hotspot connected with the network 110 and/or a wireless carrier system that can be implemented using various data processing equipment, communication towers (e.g., cell towers), etc. The network 110 may carry communications (e.g., data, message, packets, frames, etc.) between the various components of the administration device 120 and/or the node device(s) 140.

Referring to FIG. 1, the node devices 140 may be interconnected and/or grouped into a blockchain 150. The blockchain 150 is a linked list of records, called blocks 155. Each of the node devices 140 may include a copy of the linked list of the blocks 155 of the blockchain 150. For example, as illustrated in FIG. 1, the blockchain 150 may include node devices 140A, 140B, 140C, 140D, and 140E. The number of node devices 140 in the blockchain 150 illustrated in FIG. 1 is merely an example, and is not intended to limit the embodiments of the present disclosure. The blockchain 150 may be a public or private blockchain 150. In a public blockchain 150, anyone is free to join and participate in the core activities of the blockchain 150. A private blockchain 150 allows only selected and verified participants. In some private blockchains 150, an administrator of the blockchain 150 has the rights to override, edit, or delete entries on the blockchain 150.

The blocks 155 of the blockchain 150 are linked together, in part, using cryptography. Each block 155 contains a cryptographic hash of the previous block 155, a timestamp, and transaction data 132 including transaction metadata. As blocks 155 each contain information about the block 155 previous to it, they form a chain, with each additional block 155 reinforcing the ones before it. Therefore, blockchains 150 are resistant to modification of their data because once recorded, the data in any given block 155 cannot be altered retroactively without altering all subsequent blocks 155.

In some embodiments, the node devices 140 may be coupled in a peer-to-peer network, where individual ones of the node devices 140 may be communicatively coupled to other ones of the node devices 140 (e.g., by network 110). The plurality of node devices 140 may each include one or more network interfaces (e.g., similar to network interfaces 180 in FIG. 1). In some embodiments, the blockchain 150 is provided as a distributed ledger that may be managed by the peer-to-peer network, where the node devices 140 collectively adhere to a protocol to communicate and validate new blocks 155 and record transaction data 132 therein.

For example, in some embodiments, a block 155 of the blockchain 150 may include the transaction data 132 that is included when the block 155 is created (e.g., "mined"). In some embodiments, each of the transactions of the transaction data 132 may be hashed, and combinations of transactions of the transaction data 132 may be further hashed, in a merkle tree. The use of a merkle tree allows for the presence of an individual transaction in the merkle to be identified from a single merkle root hash for the block 155. By analyzing the merkle root hash for a given block 155, a particular transaction of the transaction data 132 may be identified that corresponds to particular elements of the blockchain 150.

The various node devices 140 of the peer-to-peer network may use consensus to validate whether a new block 155 may be added to the blockchain 150. Consensus is used to determine whether the new block 155 is valid. For example, a consensus algorithm may be used to allow all of the node devices 140 of the blockchain 150 to reach a common agreement about the present state of the distributed ledger. In this way, consensus algorithms achieve reliability in the blockchain 150. For example, the consensus algorithm ensures that every new block 155 that is added to the blockchain 150 is agreed upon by a subset of the node devices 140 in the blockchain 150 to be valid. In some embodiments, the subset may be all, some, or a majority of the node devices 140 of the blockchain 150, but is typically greater than 50%.

In some embodiments, the processing device 160 of the node device 140 may execute a block validation engine 166. For example, the block validation engine 166 may be or include computer instructions and/or circuitry configured to perform operations associated with maintaining the blockchain 150. For example, the block validation engine 166 may include operations to perform the consensus operations described herein, and may include operations to add blocks 155 to the blockchain 150.

FIG. 1 illustrates a detailed view of one of the node devices 140 (e.g., 140B), which is intended to explain example operations of the blockchain 150 in accordance with some embodiments of the present disclosure. The detailed view of the node device 140 and the blocks 155 of the blockchain 150 is merely schematic, and it not intended to limit the various embodiments of the disclosure.

The node device 140 may include a copy of the linked list of blocks 155 of the blockchain 150. The blockchain 150 may include a plurality of linked blocks 155. For example, as illustrated in FIG. 1, the blockchain 150 may include blocks 155A, 155B, and 155C. The number of blocks 155 in the blockchain 150 illustrated in FIG. 1 is merely an example, and is not intended to limit the embodiments of the present disclosure.

The blocks 155 of the blockchain 150 may include of the transaction data 132 as contents. The transactions of the transaction data 132 may include a plurality of operations regarding tokens of the blockchain 150. In some embodiments, the transactions of the of the transaction data 132 may provide portions of the contents of the distributed ledger represented by the blockchain 150. The transactions of the of the transaction data 132 may identify, for example, transfers of tokens represented by the blockchain, including creation, sale, and/or purchase of tokens and/or other operations of the blockchain 150. In some embodiments, the transfer of tokens represented by the of the transaction data 132 may support cryptocurrency on the blockchain 150. Cryptocurrency refers to a digital currency in which transactions are verified and records maintained by a decentralized system using cryptography, such as the blockchain 150, rather than by a centralized authority, such as a government. For example, the transactions of the of the transaction data 132 may register the transfer of cryptocurrency between user accounts on the blockchain 150.

In some embodiments, the of the transaction data 132 of one or more of the blocks 155 of the blockchain 150 may be or include references to NFTs 138 including NFT metadata 135. An NFT 138, also referred to as a cryptographic NFT 138, may include portions of the blocks 155 of the blockchain 150 including the NFT metadata 135 and an NFT asset 192. The structure of the NFT 138 described herein, as well as the illustration of the NFT 138 in FIG. 1, is intended to be schematic for purposes of discussion and is not intended to limit the embodiments of the present disclosure. In some embodiments, an actual physical implementation of an NFT 138 may vary from that illustrated in FIG. 1. In some embodiments, the NFT 138 may be incorporated as a smart contract on the blockchain 150. A smart contract may refer to a program (e.g., computer instructions) stored on the blockchain 150 that runs when predetermined conditions are met.

NFT metadata 135 may include identifiers and/or other data which allows the cryptographic NFT 138 to be uniquely identifiable within the blockchain 150. The NFT metadata 135 may be implemented according to various standards. For example, the NFT metadata 135 may be implemented according to ERC (Ethereum Request for Comment) standards ERC-721 and/or ERC-1155, though the embodiments of the present disclosure are not limited to these configurations. In FIG. 1, each of the blocks 155 is illustrated as containing NFT metadata 135 (e.g., is part of an NFT 138), but this is merely for purposes of illustration, and the embodiments of the present disclosure are not limited to such a configuration. In some embodiments, the blockchain 150 may include different types of blocks 155 with different varieties of transaction data 132 interspersed on the blockchain 150.

In some embodiments, the NFT metadata 135 may include an NFT link 130. The NFT link 130 may provide a link to an NFT asset 192 being represented by the NFT metadata 135. For example, the NFT link 130 may be a uniform resource identifier (URI) or other link referring to NFT asset 192, which may be used to access the NFT asset 192. In some embodiments, in addition to the NFT asset 192, the NFT link 130 may provide a reference to additional metadata of and/or describing the NFT 138.

In some embodiments, the NFT asset 192 may be stored separately from the blockchain 150 (sometimes referred to as off-chain) though the embodiments of the present disclosure are not limited to such a configuration. In some embodiments, the NFT asset 192 may be stored in the NFT metadata 135 of the block 155. The NET asset 192 may be any type of digital data and/or a digital reference to a physical asset. For example, the NFT asset 192 may be a digital image (e.g., digitally-created art and/or a digital representation of a photograph or art), multimedia (e.g., digital audio, video, and/or the like), and/or other digital data. For example, in some embodiments, the NFT asset 192 may be or include a portion of digital data captured from a network transaction (e.g., an email or an internet transmission) and/or other types of digital communications. In some embodiments, the NFT asset 192 may be a digital reference to a real-life asset such as real or personal property. For example, the NET asset 192 may be a reference to a physical piece of art. For purposes of example only, FIG. 1 illustrates three NFTs 138A, 138B, 138C respectively having NFT metadata 135A, 135B, 135C including NFT links 130A, 130B, 130C to NFT assets 192A, 192B, 192C.

As described herein, the NFT 138 and/or the NFT metadata 135 may be uniquely identifiable within the blockchain 150. Therefore, the NFT 138 associated with the NFT metadata 135 may be uniquely distinguished from other tokens of the blockchain 150. The NFT 138 associated with the NFT metadata 135 may be capable of being uniquely owned. For example, the blockchain 150 may recognize a one-to-one association between the NFT 138 and a particular user account (also referred to as a "wallet"). This uniqueness may generate a market for such NFTs 138, with demand rising or falling for the purchase and/or sale of the NFT 138 associated with the NFT metadata 135. For example, the transactions of the of the transaction data 132 of the blockchain 150 may record transfers of ownership of the NFTs 138 associated with the NFT metadata 135 and/or NFT asset 192.

Because the NFTs 138 are hosted on the blockchain 150 (e.g., Ethereum), securitizing an NFT 138 may be difficult using legacy securitization processes. Some embodiments of the present disclosure may provide for the creation of an instrument 168 (e.g., a financial instrument 168) that is associated with a subset 195 of cryptographic NFTs 138 on the blockchain 150. In some embodiments, one or more of the NFTs 138 may be grouped into a subset 195 by an instrument administration engine 164 of the administration device 120. The subset 195 may also be referred to herein as a tranche 195. The subset 195 may combine one or more of the NFTs 138 into an asset tracked by instrument 168. For example, FIG. 1 illustrates that a first NFT 138A and a second NFT 138B are grouped into a subset/tranche 195. A third NFT 138C, as well as its corresponding third block 155C, are not included in the tranche 195 in the non-limiting example of FIG. 1.

The subset and/or tranche 195 may represent a segmentation of the NFTs 138 that may be provided to customers and/or investors as instrument 168. The tranche 195 of the instrument 168 may represent a subset of the NFTs 138 having risk characteristics such as a particular term, risk level, and/or return. Different terms, risk levels, terms, and/or returns may be provided by different tranches 195. Thus, different combinations of the NFTs 138 may be made that provide different tranches 195, and may represent different investment products that may be associated with the instruments 168.

By representing the tranche 195 as a collection of NFTs 138 within blocks 155 on the blockchain 150, a number of benefits may be accomplished. For example, the tranche 195 may be more easily analyzed. Each block 155 of the tranche 195 may be traversed to identify the NFT 138 and the NFT metadata 135 analyzed to retrieve the NFT link 130 to the NFT asset 192. Utilizing the blockchain 150 allows the NET asset 192 of each NFT 138 of the tranche 195 associated with the instrument 168 to be systematically and programmatically analyzed in a way that is not currently possible.

The instrument 168 may be created and/or maintained by instrument administration engine 164. In some embodiments, the instrument 168 may be stored on the administration device 120 in instrument store 169 of the administration device 120, which may be, for example, a portion of the memory 170 and/or the storage device 175, but the embodiments of the present disclosure are not limited thereto. In some embodiments, the instrument 168 may be stored separately.

In some embodiments, the instrument administration engine 164 may perform operations to create, maintain, and/or terminate the instrument 168. For example, the instrument administration engine 164 may select NFTs 138 for inclusion in the tranche 195. In some embodiments, the instrument administration engine 164 may perform operations to provide a valuation of the instrument 168, additional details of which will be provided herein. In some embodiments, the instrument administration engine 164 may be responsive for performing transactions (e.g., utilizing network 110) that facilitate payments associated with the instrument 168.

The instrument 168 may allow for investments to be made in the tranche 195 of NFTs 138. For example, as the collective value of the NFTs 138 increase, the value of the instrument 168 which represents the tranche 195 of NFTs may increase, including associated payouts for the instrument 168. Similarly, as the collective value of the NFTs 138 decreases, the value and associated payments of the instrument 168 may decrease. In some embodiments, various risk positions may be established for the instrument 168 that allow for different payout options and/or associated risks based on the value of the tranche 195 of NFTs 138. These risk positions may be incorporated as part of the instrument 168. Additional details for an example of the types of instrument 168 that may be provided associated with a tranche 195 of NFTs 138 will be described herein.

Figure 2:
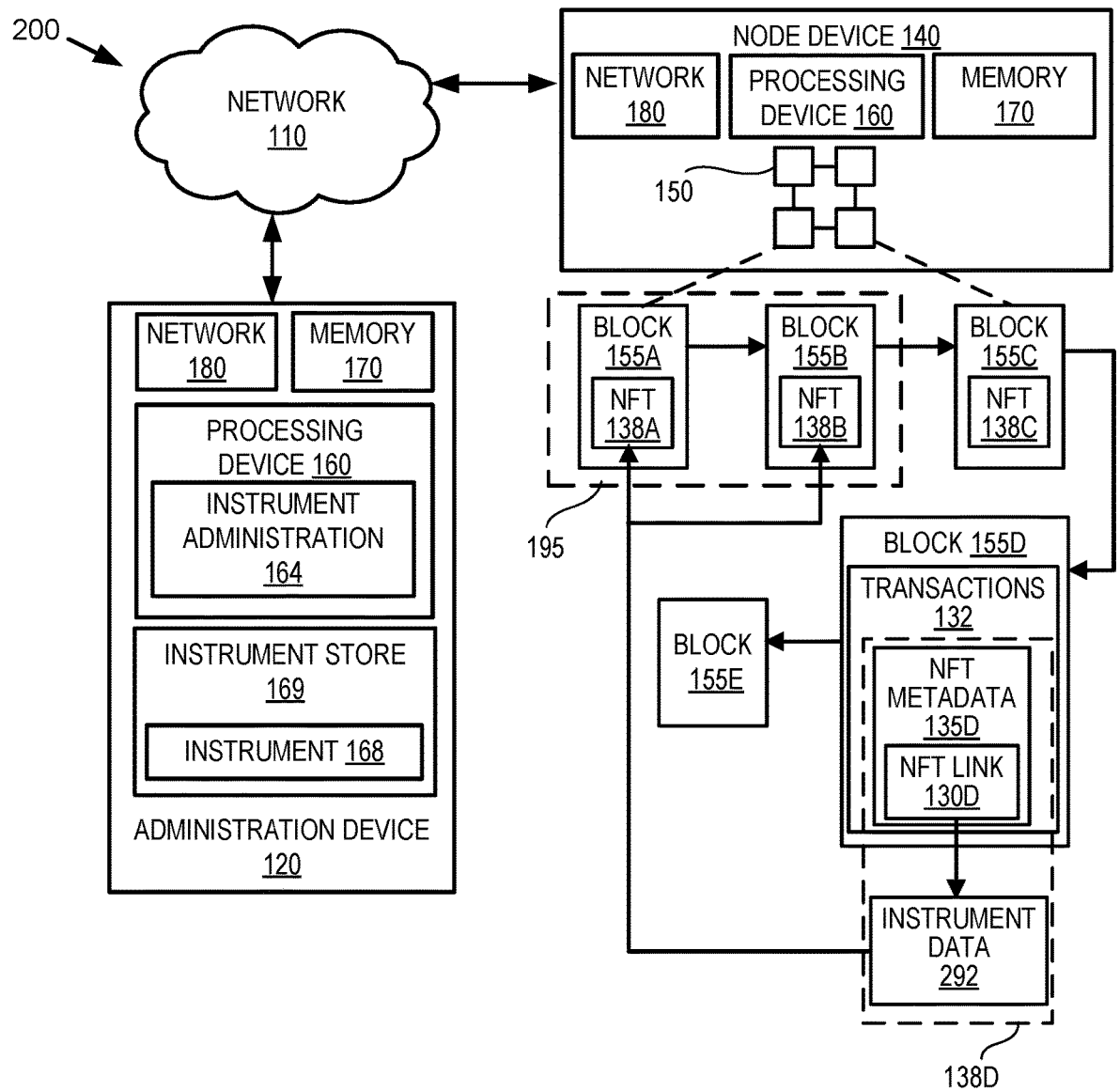
FIG. 2 depicts a high-level component diagram of an illustrative example of a system architecture incorporating a tranche as an NFT, in accordance with one or more aspects of the present disclosure.

In some embodiments, the instrument 168 associated with the tranche 195 itself may be provided and/or recorded as an NFT 138. For example, FIG. 2 depicts a high-level component diagram of an illustrative example of a system architecture 200 incorporating a tranche 195 as an NFT 138, in accordance with one or more aspects of the present disclosure. A description of elements of FIG. 2 that have been previously described will be omitted for brevity.

In FIG. 2, blockchain 150 is illustrated, and blocks 155A, 155B, and 155C may represent blocks 155 that represent and/or include NFTs 138 as in FIG. 1. Blocks 155A and 155B have been grouped into a tranche 195 represented by instrument 168 (e.g., by instrument administration engine 164 of the administration device 120) as described with respect to FIG. 1. In some embodiments, the tranche 195 may also be represented by a block 155 on the blockchain 150. For example, a fourth block 155D may be or include reference to a fourth NFT 138D that includes NFT metadata 135D. The NFT metadata 135D may identify the contents of the blockchain 150 associated with the NFT 138D, which allows the NFT 138D to be uniquely identifiable within the blockchain 150. In some embodiments, the NFT metadata 135D may include a NFT link 130D. The NFT link 130D may provide a link to the NFT asset, which may be instrument data 292 of the instrument 168 for the tranche 195 being represented by the NFT 138D. For example, the NFT link 130D may be a URI or other link referring to instrument data 292 describing the tranche 195. In some embodiments, the NFT link 130D may refer to a unique identification number or other unique identifying characteristic of the subset/tranche 195 and/or instrument 168 (i.e., a unique identification number that may be queried to determine the elements of the subset/tranche 195 and/or instrument 168). In some embodiments, the instrument data 292 may be or refer to the instrument 168 stored in the instrument store 169 of the administration device 120.

The NFT link 130D for the instrument NFT 138D may be used to access the instrument data 292 associated with the tranche 195 and/or the instrument 168. In some embodiments, the instrument data 292 may be stored separately from the blockchain 150 (e.g., off-chain) though the embodiments of the present disclosure are not limited to such a configuration. In some embodiments, the instrument data 292 may be stored in the NFT metadata 135 of the block 155. When stored off-chain, the instrument data 292 may be capable of being modified without modifying the NFT metadata 135, which may allow for the instrument data 292 to be kept current without having to alter the block 155.

The instrument data 292 may describe the tranche 195 being represented by the respective NFT 138D of the blockchain 150. The instrument data 292 may include a link to the NFTs 138 that make up the tranche 195. For example, referring to FIG. 2, the instrument data 292 may include a link to the first NFT 138A and the second NFT 138B that make up the tranche 195. In this way, the instrument data 292 may be examined to determine the respective members of the tranche 195, which may then be traversed and analyzed (e.g., programmatically) to detect the members of the tranche 195.

The instrument data 292 may also include additional details regarding the makeup of the tranche 195. The instrument data 292 may include data describing the tranche 195, including risk characteristics of the tranche 195. For example, the instrument data 292 may include an indication of the seniority level of the tranche 195 (e.g., junior, mezzanine, senior, etc.) as well as attachment and detachment points of the tranche 195. Other data regarding the tranche 195 may be stored in the instrument data 292 without exceeding the scope of the present disclosure.

Referring to FIGS. 1 and 2, the use of an NFT 138 to represent the tranche 195 of the NFTs 138 of the instrument 168 may allow for the members of the tranche 195 to be transparently displayed on the blockchain 150. Because the contents of the blockchain 150 are immutable and traversable, the tranche 195, as well as the NFTs 138 that make it up, may be transparently displayed and programmatically traversed to determine the underlying blocks 155 representing the NFTs 138 of the tranche 195, and thus the NFTs 138 representing the instrument 168 may be programmatically reviewed and/or analyzed. The blocks 155 representing the NFTs 138 of the tranche 195 may further lead to the NFT assets 192 providing additional data regarding the NFTs 138 of the instrument 168. In this way, detailed data regarding a tranche 195 of the instrument 168, as well as the NFTs 138 which make up the tranche 195, may be programmatically accessed.

In some embodiments, the creation of a block 155 that includes an NFT 138 may trigger its inclusion in the tranche 195. For example, the instrument administration engine 164 may detect the creation of a block 155 having NFT metadata 135 and determine that the block 155 is acceptable for inclusion in the tranche 195. In some embodiments, the administration device 120 may receive a request (e.g., a communication on the network 110) for the creation of the instrument 168 and/or a tranche 195 associated with an existing instrument 168. The request may include parameters for the tranche 195 and/or instrument 168 to be created. In response to the request, the instrument administration engine 164 may scan the blockchain 150 to detect blocks 155 that include NFT metadata 135 including an NFT link 130 (see FIG. 1) and analyze the NFT asset 192 associated with the NFT 138 to determine that the block 155 is acceptable (e.g., the characteristics of the NET asset 192 match those of the requested tranche 195) for inclusion in the tranche 195.

Figure 3A:
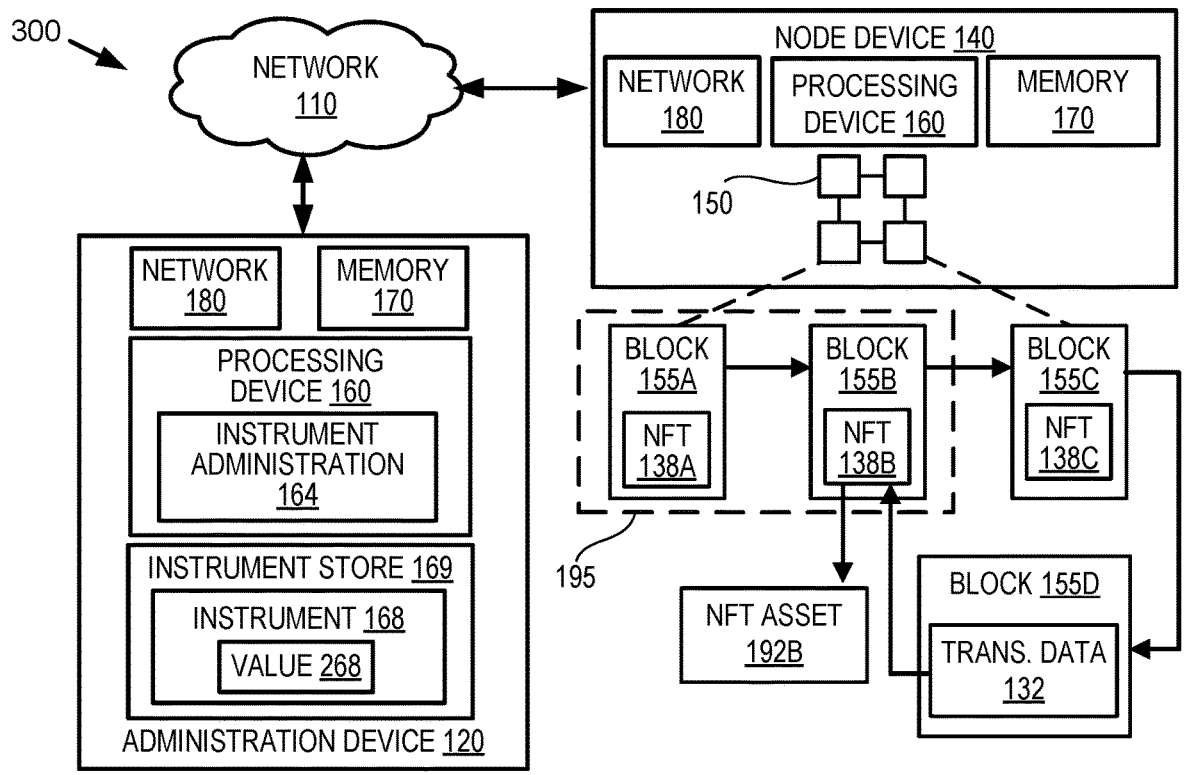
FIG. 3A is a high-level component diagram of an illustrative example of a system architecture receiving a transaction related to an NFT, in accordance with one or more aspects of the present disclosure.

In some embodiments, the use of a blockchain 150 to represent the instruments 168 and/or the NFTs 138 of the tranche 195 may allow for the tranche 195 to be created, modified and/or administered responsive to transactions that are detected on the blockchain 150. FIG. 3A is a high-level component diagram of an illustrative example of a system architecture 300 detecting a transaction related to an NFT 138, in accordance with one or more aspects of the present disclosure. A description of elements of FIG. 3A that have been previously described will be omitted for brevity.

In FIG. 3A, blockchain 150 is illustrated having blocks 155A, 155B, and 155C including respective NFTs 138A, 138B, and 138C as in FIG. 1. In some embodiments, the instrument administration engine 164 of the administration device 120 may monitor the blockchain 150 to detect the addition of particular blocks 155. Referring to FIG. 3A, the administration device 120 may detect a fourth block 155D added to the blockchain 150. The block 155D may include transaction data 132 that is indicative of one or more transactions associated with the blocks 155 of the blockchain 150. Referring to FIG. 3A, an example is illustrated in which the transaction data 132 of the block 155D refers to the second NFT 138B of the second block 155B, which may be part of the tranche 195 (as illustrated in FIG. 1). The transaction data 132 may refer, for example, to a creation and/or a sale of the second NFT 138B that is recorded on the blockchain 150.

Responsive to detecting the creation of the block 155D referencing the transaction data 132, the instrument administration engine 164 of the administration device 120 may create and/or modify tranche 195. For example, the tranche 195 may be created including the first NFT 138A and the second NFT 138B. As a non-limiting example, the instrument administration engine 164 may determine, based on the transaction data 132 of the block 155D on the blockchain 150, that the NFT 138B referred to by the second block 155B has a profile that is acceptable for the tranche 195. Stated another way, the instrument administration engine 164 of the administration device 120 may determine characteristics of various NFTs 138 associated with blocks 155 on the blockchain 150 based on transaction data 132 posted to the blockchain 150. For example, in some embodiments, the instrument administration engine 164 may be configured to calculate a risk and/or value of a particular instrument 168 (e.g., based on instrument data 292 associated with the instrument 168, as illustrated in FIG. 2), and may be configured to calculate an associated risk and/or value of a tranche 195 based on the NFTs 138 that make up the tranche 195. By monitoring the blockchain 150, the instrument administration engine 164 may be able to automatically generate the tranche 195 having the appropriate characteristics, such as risk level, term, value, etc. so as to be included in the tranche 195. By using the blockchain 150, decisions about the generation of a tranche 195 may be made automatically based solely on data that may be retrieved through access to the blockchain 150.

In some embodiments, the instrument administration engine 164 may be configured to calculate a value 268 of the instrument 168 based on the respective values of the NFTs 138 that make up the tranche 195 associated with the instrument 168. For example, the value of the NFT 138 may be calculated as a sum of the respective values of the NFTs 138 that make up the tranche 195. In some embodiments, the value of a respective NFT 138 may be based on the last recorded (e.g., recorded in the blockchain 150) sale of the NFT 138. For example, as NFTs 138 are bought and sold, individual values of the NFTs 138 may be adjusted. In some embodiments, the value of a particular NFT 138 may be time adjusted and/or normalized. In some embodiments, the value of a particular NFT may be normalized based on a duration between two transactions associated with the NFT 138. For example, in some embodiments, the most two recent transactions of individual NFTs 138 can be used to estimate the current value of the NFT 138. For example, if an NFT 138 has a transaction valued at $100 NFT in a first year and sells at $150 on June 30th of the same year, a value of the NFT 138 on December 31st of that year may be estimated to be $200. For computing the value of individual NFTs 138, many other extrapolation or estimation methods can be used as well.

Figure 3B:
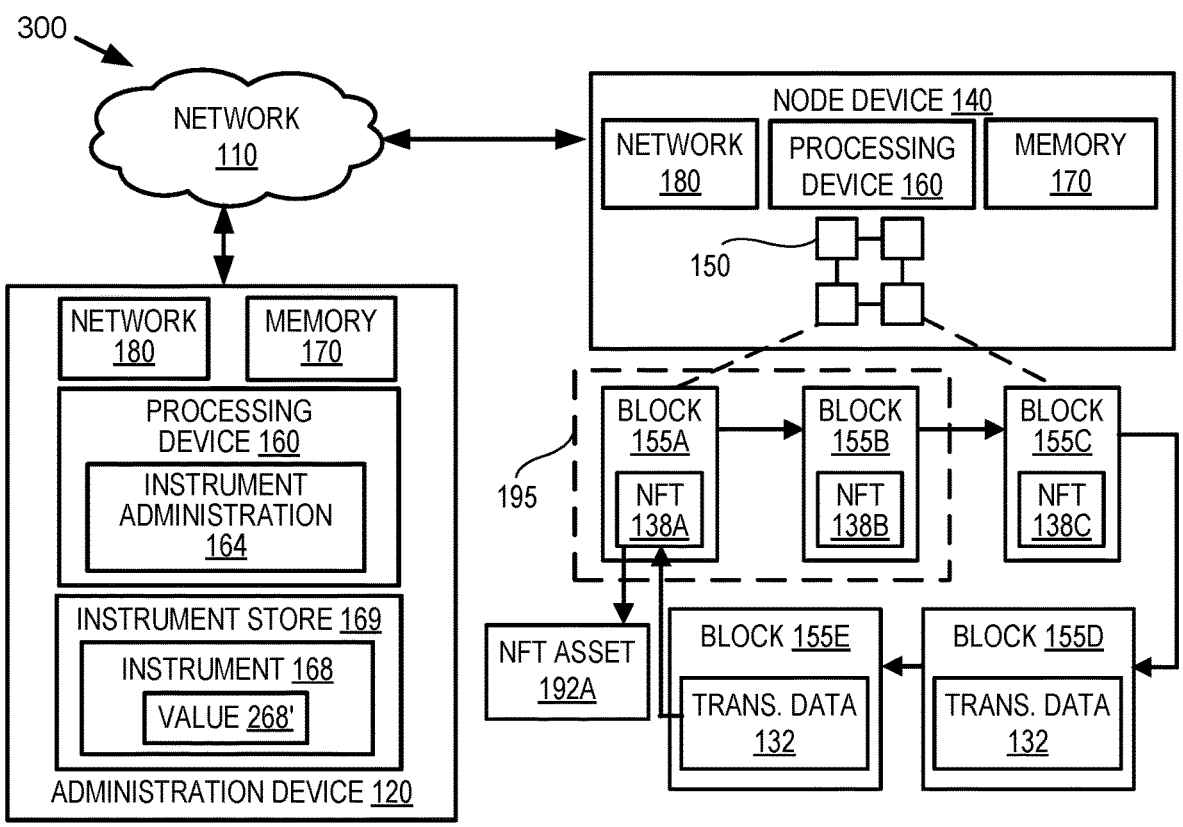
FIG. 3B is a high-level component diagram of an illustrative example of a system architecture modifying a value of a tranche, in accordance with one or more aspects of the present disclosure.

FIG. 3B is a high-level component diagram of an illustrative example of a system architecture 300 modifying a value of a tranche 195, in accordance with one or more aspects of the present disclosure. A description of elements of FIG. 3B that have been previously described will be omitted for brevity.

In FIG. 3B, blockchain 150 is illustrated having blocks 155A, 155B, and 155C including respective NFTs 138A, 138B, and 138C as in FIG. 1. In addition, FIG. 3B illustrates the blockchain 150 after the creation of the tranche 195 responsive to the block 155D illustrated in FIG. 3A. In some embodiments, the instrument administration engine 164 of the administration device 120 may monitor the blockchain 150 to detect the addition of particular blocks 155. Referring to FIG. 3B, the administration device 120 may detect a fifth block 155E added to the blockchain 150. The block 155E may include transaction data 132 that is indicative of a transaction associated with one or more of the NFTs 138 associated with the blocks 155 of the blockchain 150. In FIG. 3B, an example is illustrated in which the transaction data 132 of the block 155E refers to the first NFT 138A, which may be associated with the tranche 195 if the instrument 168 as illustrated in FIG. 1. In some embodiments, the transaction data 132 of the block 155E may refer to a transaction such as a purchase of the NFT 138A (e.g., a change of ownership).

Responsive to detecting the creation of the block 155E referencing the transaction data 132, the instrument administration engine 164 of the administration device 120 may modify the value 268 of the instrument 168 associated with the tranche 195 to be a modified value 268'. For example, a value 268 associated with the tranche 195 of FIG. 3A may be modified responsive to the transaction data 132 of the block 155E. For example, the instrument administration engine 164 may analyze the transaction associated with the NFT 138A to determine a value of the sale of the NFT 138A. The value 268 of the instrument 168 may be modified to the modified value 268' based on the contribution of the NFT 138A to the tranche 195. For example, the modified value 268' may represent the change in the valuation of the instrument 168 based on transaction (as represented by the transaction data 132) associated with the first NFT 138A of the tranche 195. By monitoring the blockchain 150, the instrument administration engine 164 may be able to automatically modify the tranche 195 to adjust the value 268' of the tranche 195 based on the underlying characteristics of the transactions associated with the NFTs 138 of the tranche 195. By using the blockchain 150, decisions about the valuation of a tranche 195 may be made automatically based solely on data that may be retrieved through access to the blockchain 150.

In some embodiments, the instrument 168 may allow for a number of different types of investment options based on the tranche 195. For example, different risk characteristics of the instrument 168 may be modified to adjust a risk of the instrument 168. In some embodiments, the instrument 168 may have a term, a premium payment, an upper cutoff value, and a lower cutoff value that may be adjusted to vary a relative risk of the instrument 168 based on the value 268 of the instrument 168 calculated based on the respective values of the NFTs 138 of the tranche 195. In some embodiments, these risk characteristics may be stored as part of the data associated with the tranche 195 and/or instrument 168, such as part of instrument data 292 of FIG. 2.

Figure 4:
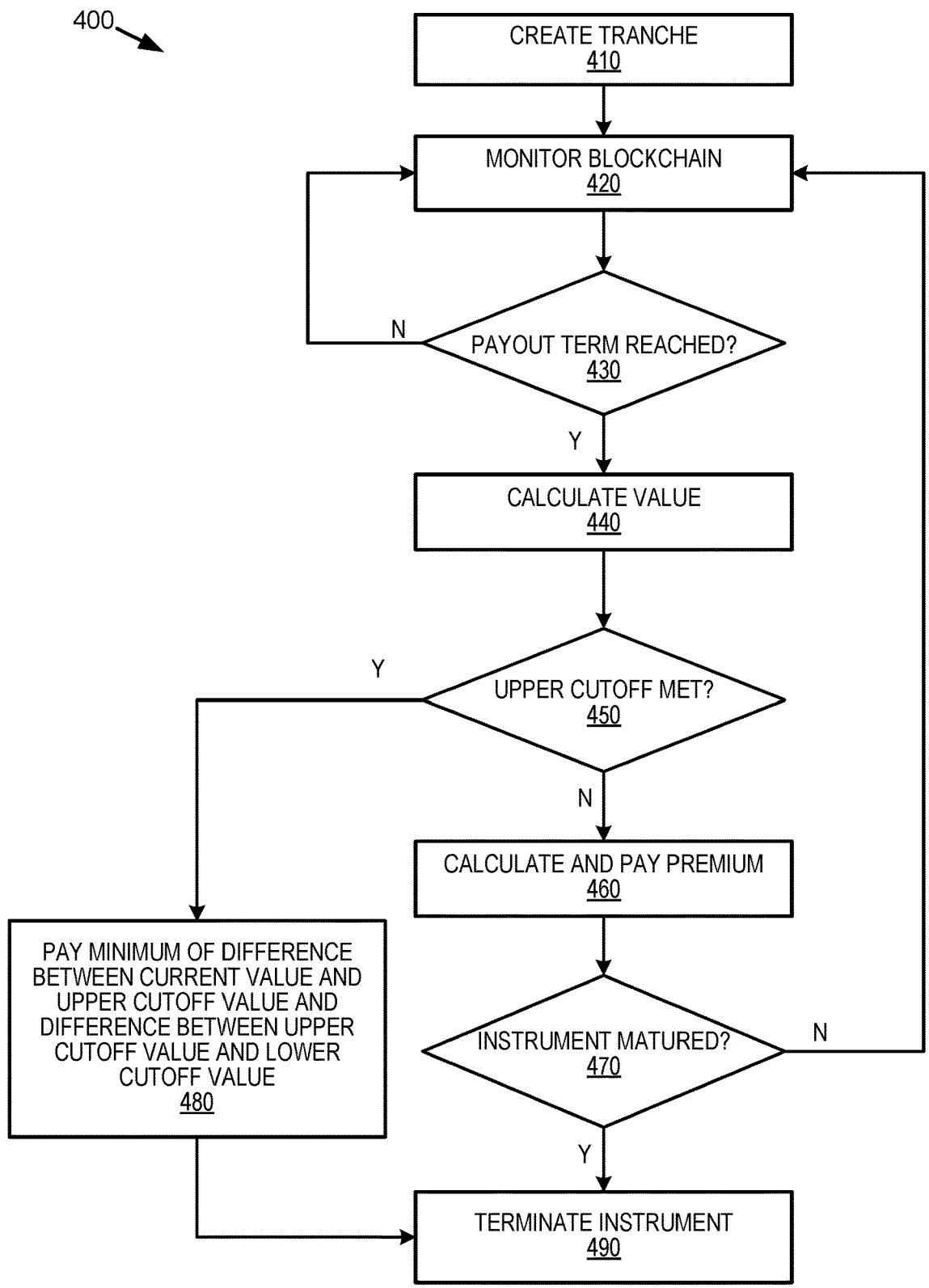
FIG. 4 is a flow diagram of an example of a method for administering an instrument based on the value of the tranche of NFTs, in accordance with some example embodiments described herein.

FIG. 4 is a flow diagram of an example of a method 400 for administering the instrument 168 based on the value 268 of the tranche 195 of NFTs 138, in accordance with some example embodiments described herein. A description of elements of FIG. 4 that have been previously described will be omitted for brevity. The operations of method 400 illustrated in FIG. 4 may, for example, be performed by administration device 120 of the system architectures 100, 200, 300 (described previously with reference to FIGS. 1, 2, 3A, and 3B). To perform the operations described below, the administration device 120 may utilize one or more of processing device 160, memory 170, network hardware 180, instrument administration engine 164, and/or any combination thereof. It will be understood that user interaction with the administration device 120 may occur directly via network hardware 180, or may instead be facilitated by similar or equivalent physical componentry facilitating such user interaction.

In operation 410, a tranche 195 may be created. The tranche 195 may be a collection of one or more NFTs 138 within a blockchain 150, as described herein with respect to FIGS. 1, 2, 3A, and 3B. In some embodiments, the tranche 195 may have a plurality of risk characteristics, including a premium payment value, a maturity date and/or term, a payout term, an upper cutoff value, and a lower cutoff value. The premium value, a maturity date, payout term, an upper cutoff value, and a lower cutoff value may establish points that control the operation of the instrument 168. As a non-limiting example, the discussion with respect to FIG. 4 will assume an example of a premium value of 3%, a maturity date of 5 years, a payout term of a year, an upper cutoff value of $1100, and a lower cutoff value of $800.

The tranche 195 may be created as part of the instrument 168, which may be managed and/or operated on by the instrument administration engine 164 described herein. In some embodiments, the instrument 168 may be formed between a first party and a second party. For example, the first party may be a bank and the second party may be an individual investor, but the embodiments of the present disclosure are not limited to such a configuration.

In the example of FIG. 4, for every year (e.g., the payout term) of the term of the instrument 168, if the value 268 of the tranche 195 is above the upper cutoff value, a second party is paid the premium by a first party. This will continue until the maturity date or until the value of the tranche 195 falls below the upper cutoff value. In a given year, if the current value 268 of the tranche 195 falls below the upper cutoff value, the instrument 168 terminates, and the second party pays the first party the difference between the value 268 of the tranche 195 and the upper cutoff value, with a cap on the payout being the difference between the upper cutoff value and the lower cutoff value.

In operation 420, the blockchain 150 may be monitored for the addition of new blocks 155 related to the NFTs 138 of the tranche 195. For example, as new blocks 155 are added, transaction data 132 of the new blocks 155 may be examined. In some embodiments, the transaction data 132 may be examined to identify a reference to an NFT 138 that is part of the tranche 195. As described herein, the NFT 138 may have a unique identification identifier that may allow for it to be uniquely identified within the transaction data 132. For example, a tranche 195 may be created having 2 NFTs, such as a first NFT 138A and a second NFT 138B similar to the example of FIG. 1.

As illustrated in operation 430, the monitoring of the blockchain 150 as performed in operation 420 may continue until the payout term has been reached, as illustrated in operation 430. If the payout term has not been reached (430: N), operation 420 may be continued. If the payout term has been reached (430: Y), the operations may continue with operation 440 in which a value of the tranche 195 may be calculated based on the individual values of the NFTs 138 of the tranche 195. In an example, the monitoring of the blockchain 150 may continue for the payout term of a year (e.g., the payout term). At the end of the year, operation 440 may be performed.

In operation 440, the value of the tranche 195 may be calculated by calculating the individual values of the NFTs 138 of the tranche 195. In some embodiments, the value of an individual NFT 138 may be based on a most recent sale of the NFT 138 (as detected by monitoring of the transaction data 132 of the blocks 155 of the blockchain 150). In some embodiments, the value of an individual NFT 138 may be based on an average of the last X transactions involving the NFT 138, where X may be set based on a preference of the instrument 168. For example, the value of an individual NFT 138 may be based on an average of the last two sales of the NFT 138. In some embodiments, the value of an individual NFT 138 may be based on a threshold number (e.g., Y) of transactions of the NFT 138 that are adjusted based on a timing of the transactions. For example, if an NFT 138 has a value at the beginning of the payout term (e.g., a year) of $100 and a transaction is detected for the NFT 138 on June 30th at $150, the value of the NFT 138 at the end of the year (e.g., December $31^{st}$) may be extrapolated and/or estimated to be $200, based on the increase in the value of $50 for the first six months of the year. The calculation of the value of the individual NFT 138 will repeat for every NFT 138 of the tranche 195. The value 268 of the tranche 195 may be the sum of the values of the individual NFTs 138 of the tranche 195. In will be understood that other techniques for calculating the value of individual NFTs 138 may be used without deviating from the embodiments of the present disclosure. As an example, a value of the first NFT 138A may be calculated to be $800 and the value of the second NFT 138B may be calculated to be $700. Therefore, the value 268 of the tranche 195 may be calculated to be $1500.

In operation 450, the value 268 of the tranche 195 may be analyzed to determine if the upper cutoff value is met. If the upper cutoff value is not met (450: N), the operations may continue with operation 460 in which the premium for the tranche 195 may be calculated and paid. For example, with a premium value of 3%, the premium may be calculated to be $45 based on the calculated value 268 of the tranche 195 (3%×$1500). In some embodiments, the premium may be paid by the first party to the second party.

After the premium has been calculated and paid in operation 460, the operations may continue with operation 470 in which it is determined whether the instrument 168 has matured. If the instrument 168 has not matured (470: N), the operations begin again at operation 420 to monitor the blockchain 150. If the instrument 168 has matured (470: Y), the instrument 168 may terminate at operation 490. As an example, if the instrument 168 has a maturity date of five years, the monitoring of the blockchain 150 and the payout of the premium (assuming the upper cutoff value has not been bet) will continue for five years before the instrument 168 terminates.

If, in operation 450, it is determined that the value 268 of the tranche 195 is below the upper cutoff value (450: Y), the operations may proceed to operation 480 in which a payout is made of a minimum of the difference between the current value 268 of the tranche 195 and the difference between the upper cutoff value and the lower cutoff value. If, for example, the value of the first NFT 138A was determined to be $500 and the value of the second NFT 138B was determined to be $500 (for a value of the tranche 195 of $1000) then operation 450 would determine that the upper cutoff limit of $1100 was met, and an amount of the difference between the upper cutoff value and the value 268 of the tranche 195 would be paid. In the example case, the amount paid would be $100 ($1100-$1000) based on a value of the tranche 195 of $1000 and an upper cutoff value of $1100.

In some embodiments, the amount paid may be capped at a difference between the upper cutoff value and the lower cutoff value. For example, if the value 268 of the tranche 195 were calculated to be $700, the most that would be paid would be $300 ($1100-$800) based on an upper cutoff value of $1100 and a lower cutoff value of $800. In some embodiments, the payout of operation 480 may be paid by the second party to the first party.

After operation 480 (e.g., after the value 268 of the tranche 195 is calculated to be below the upper cutoff value), the operations may proceed to operation 490 to terminate the instrument 168 (e.g., regardless of whether the maturity date of the instrument 168 has been reached).

The operations of the method 400 to administer the instrument 168 illustrated in FIG. 4 allow for an improved securitization for a digital asset, such as an NFT 138. Since the value of a given NFT 138 may be quite volatile, the use of a tranche 195 of NFTs 138 may allow for the volatility to be diversified. Moreover, the use of operations such as those described herein with respect to FIG. 4 may provide for sophisticated risk management that allows for many configuration options with regard to changes in the value 268 of the tranche 195. Moreover, because NFTs can be transacted more easily and quickly than traditional assets (e.g., mortgages or the like) that are subject to securitization, the operations set forth in FIG. 4 provide a technical implementation allowing for real-world management of tranches of NFTs (or other new asset classes) that may be subject to faster trading velocity. The operations of FIG. 4 are merely an example, and those of ordinary skill in the art will recognize that numerous variations are possible without deviating from the scope of the present disclosure.

In some embodiments, the payments described with respect to FIG. 4 (e.g., the premium payments of operation 460 and/or the payouts of operation 480) may be made automatically. In some embodiments, the payments described with respect to FIG. 4 may be made electronically via the blockchain 150. For example, the blockchain 150, as described herein with respect to FIGS. 1, 2, 3A, and 3B may support transactions (e.g., as described by transaction data 132) involving tokens of value within the blockchain 150. For example, the blockchain 150 may support transactions including the transfer of cryptocurrency. In some embodiments, the administration device 120 may make the payments described with respect to FIG. 4 as cryptocurrency payments on the blockchain 150. Such an example may allow for the transactions of FIG. 4 to take place entirely within a digital environment, with all, or most, transactions supporting the instrument 168, including payments, to be made with respect to the blockchain 150.

Example Implementing Apparatuses

Figure 5:
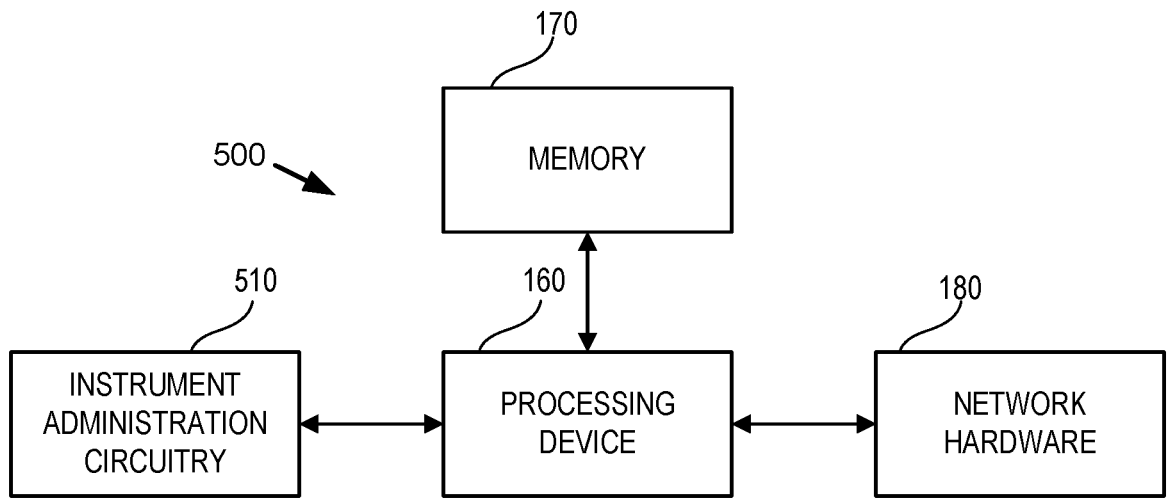
FIG. 5 illustrates a schematic block diagram of example circuitry embodying a device that may perform various operations in accordance with some example embodiments described herein.

Administration device 120 of the system architectures 100, 200, 300 (described previously with reference to FIGS. 1, 2, 3A, 3B, and 4) may be embodied by one or more computing devices or servers, shown as apparatus 500 in FIG. 5. As illustrated in FIG. 5, the apparatus 500 may include processing device 160, memory 170, network hardware 180, and instrument administration circuitry 510, each of which will be described in greater detail below. While the various components are only illustrated in FIG. 5 as being connected with processing device 160, it will be understood that the apparatus 500 may further comprises a bus (not expressly shown in FIG. 5) for passing information amongst any combination of the various components of the apparatus 500. The apparatus 500 may be configured to execute various operations described above in connection with FIGS. 1, 2, 3A, 3B, and 4 and below in connection with FIGS. 7-9.

The processing device 160 (and/or co-processor or any other processor assisting or otherwise associated with the processing device 160) may be in communication with the memory 170 via a bus for passing information amongst components of the apparatus 500. The processing device 160 may be embodied in a number of different ways and may, for example, include one or more processing devices configured to perform independently. Furthermore, the processing device 160 may include one or more processing devices configured in tandem via a bus to enable independent execution of software instructions, pipelining, and/or multithreading. The use of the term "processing device" may be understood to include a single core processor, a multi-core processor, multiple processors of the apparatus 500, remote or "cloud" processors, or any combination thereof.

The processing device 160 may be configured to execute software instructions stored in the memory 170 or otherwise accessible to the processing device (e.g., software instructions stored on a separate storage device 175, as illustrated in FIG. 1). In some cases, the processing device 160 may be configured to execute hard-coded functionality. As such, whether configured by hardware or software methods, or by a combination of hardware with software, the processing device 160 represents an entity (e.g., physically embodied in circuitry) capable of performing operations according to various embodiments of the present invention while configured accordingly. As another example, when the processing device 160 is embodied as an executor of software instructions, the software instructions may specifically configure the processing device 160 to perform the algorithms and/or operations described herein when the software instructions are executed.

Memory 170 is non-transitory and may include, for example, one or more volatile and/or non-volatile memories. In other words, for example, the memory 170 may be an electronic storage device (e.g., a computer readable storage medium). The memory 170 may be configured to store information, data, content, applications, software instructions, or the like, for enabling the apparatus to carry out various functions in accordance with example embodiments contemplated herein.

The network hardware 180 may be any means such as a device or circuitry embodied in either hardware or a combination of hardware and software that is configured to receive and/or transmit data from/to a network and/or any other device, circuitry, or module in communication with the apparatus 500. In this regard, the network hardware 180 may include, for example, a network interface for enabling communications with a wired or wireless communication network. For example, the network hardware 180 may include one or more network interface cards, antennas, buses, switches, routers, modems, and supporting hardware and/or software, or any other device suitable for enabling communications via a network (e.g., network 110). Furthermore, the network hardware 180 may include the processing circuitry for causing transmission of such signals to a network or for handling receipt of signals received from a network.

The network hardware 180 may further be configured to provide output to a user and, in some embodiments, to receive an indication of user input. In this regard, the network hardware 180 may comprise a user interface, such as a display, and may further comprise the components that govern use of the user interface, such as a web browser, mobile application, dedicated client device, or the like. In some embodiments, the network hardware 180 may include a keyboard, a mouse, a touch screen, touch areas, soft keys, a microphone, a speaker, and/or other input/output mechanisms. The network hardware 180 may utilize the processing device 160 to control one or more functions of one or more of these user interface elements through software instructions (e.g., application software and/or system software, such as firmware) stored on a memory (e.g., memory 170) accessible to the processing device 160.

In addition, the apparatus 500 further comprises an instrument administration circuitry 510 that may be configured to execute the operations of the instrument administration engine 164 described herein with respect to FIGS. 1, 2, 3A, 3B, and 4. For example, the instrument administration circuitry 510 may be configured to monitor transaction data of blocks of a blockchain, form an instrument based on one or more NFTs of the blockchain, generate and/or request generation of a block of a blockchain containing NFT metadata associated with an instrument, and/or administer the instrument based on a value of the instrument calculated from the value of the respective NFTs of the instrument, as described herein with respect to FIGS. 1, 2, 3A, 3B, and 4. Furthermore, the instrument administration circuitry 510 may be configured to examine a provided instrument to detect and/or extract instrument data from the instrument, as described herein with respect to FIGS. 1, 2, 3A, 3B, and 4. The instrument administration circuitry 510 may utilize processing device 160, memory 170, or any other hardware component included in the apparatus 500 to perform these operations, as described in connection with FIGS. 7-9 below. The instrument administration circuitry 510 may further utilize network hardware 180 to gather data from a variety of sources (e.g., the blockchain 150 and/or storage device 175, as shown in FIG. 1), and/or exchange data with a user, and in some embodiments may utilize processing device 160 and/or memory 170 to perform its operations.

Although components of FIG. 5 are described in part using functional language, it will be understood that the particular implementations necessarily include the use of particular hardware. It should also be understood that certain of these components of FIG. 5 may include similar or common hardware. For example, the instrument administration circuitry 510 may at times leverage use of the processing device 160, memory 170, or network hardware 180, such that duplicate hardware is not required to facilitate operation of this physical element of the apparatus 500 (although dedicated hardware elements may be used in some embodiments, such as those in which enhanced parallelism may be desired). Use of the terms "circuitry," and "engine" with respect to elements of the apparatus 500 therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 500 to perform the various functions described herein.

Although the instrument administration circuitry 510 may leverage processing device 160, memory 170, or network hardware 180 as described above, it will be understood that any of these elements of apparatus 500 may include one or more dedicated processing devices, specially configured field programmable gate array (FPGA), or application specific interface circuit (ASIC) to perform its corresponding functions, and may accordingly leverage processing device 160 executing software stored in a memory (e.g., memory 170), or memory 170, or network hardware 180 for enabling any functions not performed by special-purpose hardware elements. In all embodiments, however, it will be understood that the instrument administration circuitry 510 is implemented via particular machinery designed for performing the functions described herein in connection with such elements of apparatus 500.

Figure 6:
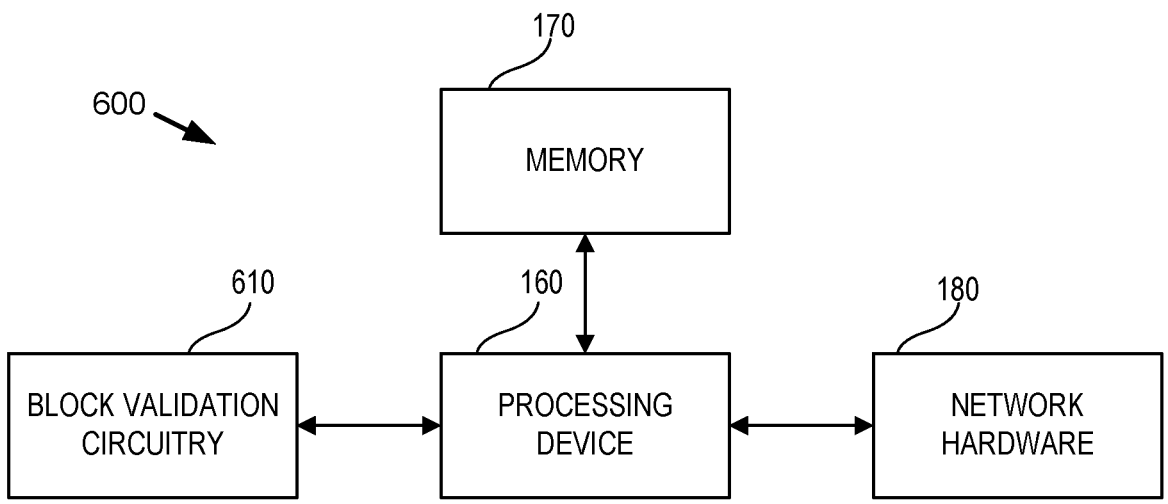
FIG. 6 illustrates a schematic block diagram of example circuitry embodying a device that may perform various operations in accordance with some example embodiments described herein.

Node device(s) 140 of the system architectures 100, 200, 300 (described previously with reference to FIGS. 1, 2, 3A, and 3B) may be embodied by one or more computing devices or servers, shown as apparatus 600 in FIG. 6. As illustrated in FIG. 6, the apparatus 600 may include processing device 160, memory 170, network hardware 180, and block validation circuitry 610, each of which will be described in greater detail below. While the various components are only illustrated in FIG. 6 as being connected with processing device 160, it will be understood that the apparatus 600 may further comprises a bus (not expressly shown in FIG. 6) for passing information amongst any combination of the various components of the apparatus 600. The apparatus 600 may be configured to execute various operations described above in connection with FIGS. 1, 2, 3A, 3B, and 4 and below in connection with FIGS. 7-9. The processing device 160, memory 170, and network hardware of the apparatus 600 of FIG. 6 may be substantially similar to those discussed herein and with respect to the apparatus 500 of FIG. 5. As such, a duplicate description thereof will be omitted.

In addition, the apparatus 600 further comprises a block validation circuitry 610 that may be configured to execute the operations of the block validation engine 166 described herein with respect to FIG. 1. For example, the block validation circuitry 610 may be configured to perform operations associated with maintaining the blockchain 150, such as performing the consensus operations and operations to add blocks 155 to the blockchain 150, as described herein with respect to FIG. 1. The block validation circuitry 610 may utilize processing device 160, memory 170, or any other hardware component included in the apparatus 600 to perform these operations, as described in connection with FIGS. 7-9 below. The block validation circuitry 610 may further utilize network hardware 180 to gather data from a variety of sources (e.g., the blockchain 150 and/or storage device 175, as shown in FIG. 1), and/or exchange data with a user, and in some embodiments may utilize processing device 160 and/or memory 170 to perform its operations.

Although components of FIG. 6 are described in part using functional language, it will be understood that the particular implementations necessarily include the use of particular hardware. It should also be understood that certain of these components of FIG. 6 may include similar or common hardware. For example, the block validation circuitry 610 may at times leverage use of the processing device 160, memory 170, or network hardware 180, such that duplicate hardware is not required to facilitate operation of these physical elements of the apparatus 600 (although dedicated hardware elements may be used for any of these components in some embodiments, such as those in which enhanced parallelism may be desired). Use of the terms "circuitry," and "engine" with respect to elements of the apparatus therefore shall be interpreted as necessarily including the particular hardware configured to perform the functions associated with the particular element being described. Of course, while the terms "circuitry" and "engine" should be understood broadly to include hardware, in some embodiments, the terms "circuitry" and "engine" may in addition refer to software instructions that configure the hardware components of the apparatus 600 to perform the various functions described herein.

Although the block validation circuitry 610 may leverage processing device 160, memory 170, or network hardware 180 as described above, it will be understood that any of these elements of apparatus 600 may include one or more dedicated processing devices 160, specially configured field programmable gate array (FPGA), or application specific interface circuit (ASIC) to perform its corresponding functions, and may accordingly leverage processing device 160 executing software stored in a memory (e.g., memory 170), or memory 170, or network hardware 180 for enabling any functions not performed by special-purpose hardware elements. In all embodiments, however, it will be understood that the block validation circuitry 610 is implemented via particular machinery designed for performing the functions described herein in connection with such elements of apparatus 600.

Example Operations

Figure 7:
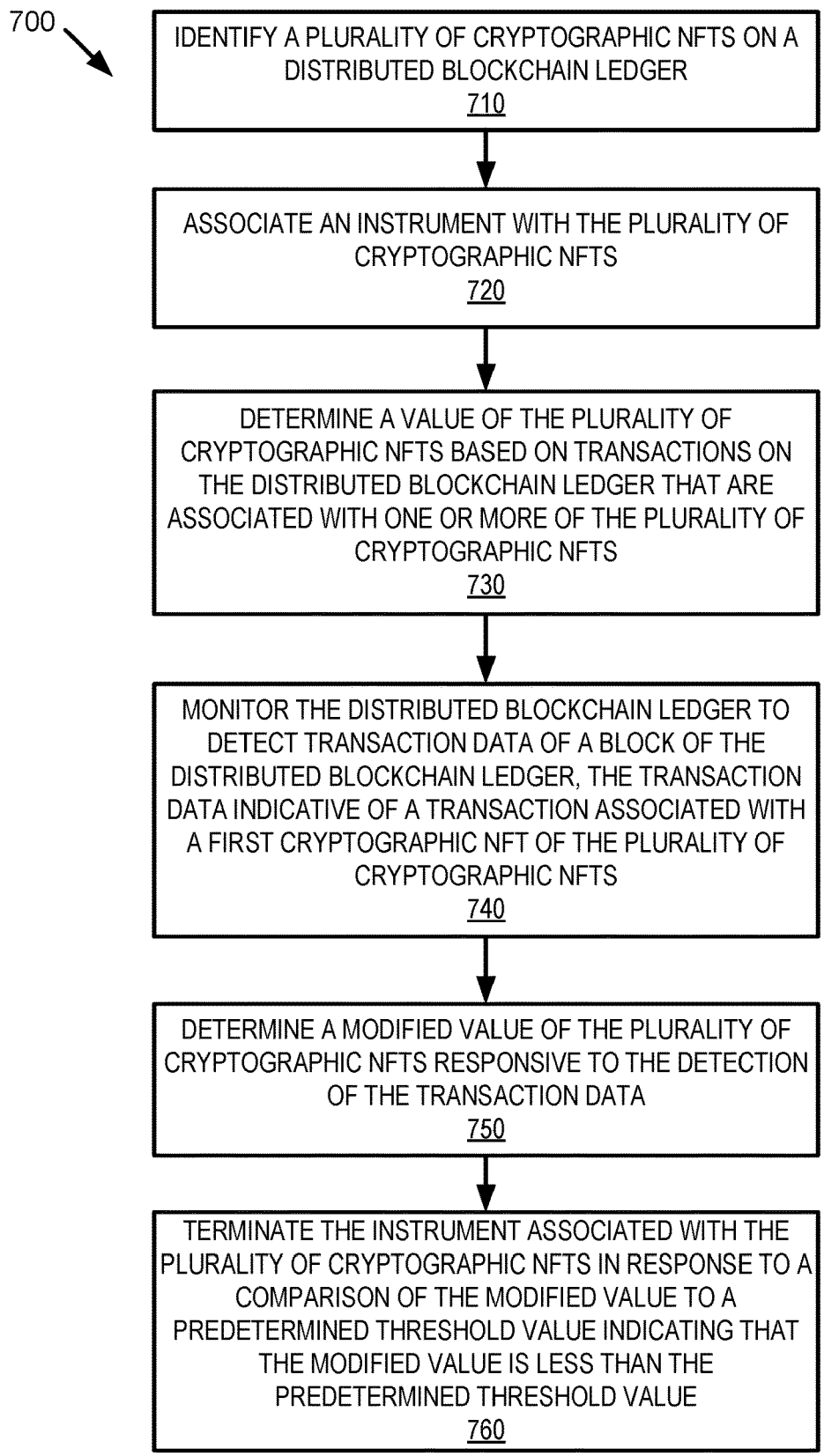
FIG. 7 is a flow diagram of a method for securitizing cryptographic NFTs of a blockchain, in accordance with one or more aspects of the disclosure
Figure 8:
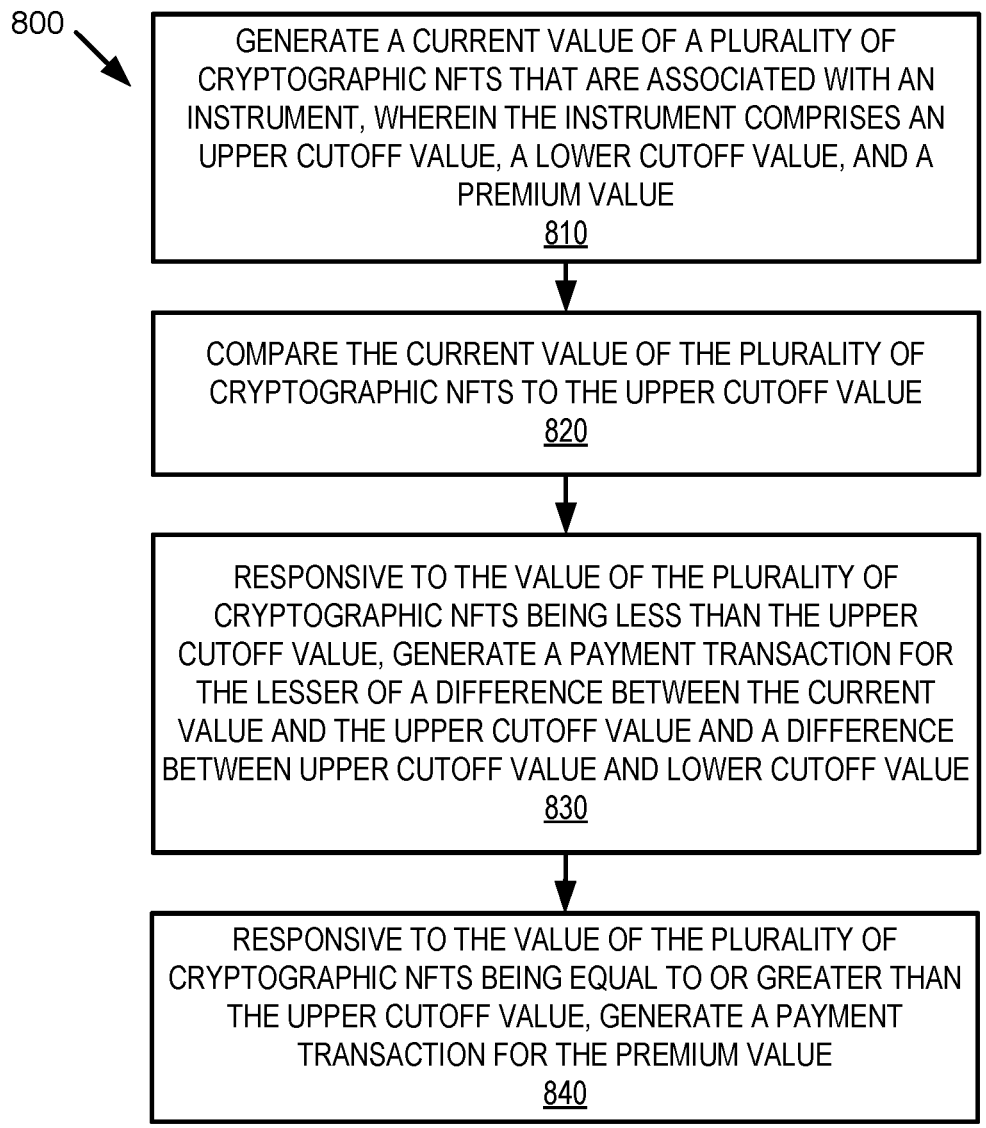
FIG. 8 is a flow diagram of a method for generating a payment transaction based on the value of the plurality of cryptographic NFTs, in accordance with one or more aspects of the disclosure.
Figure 9:
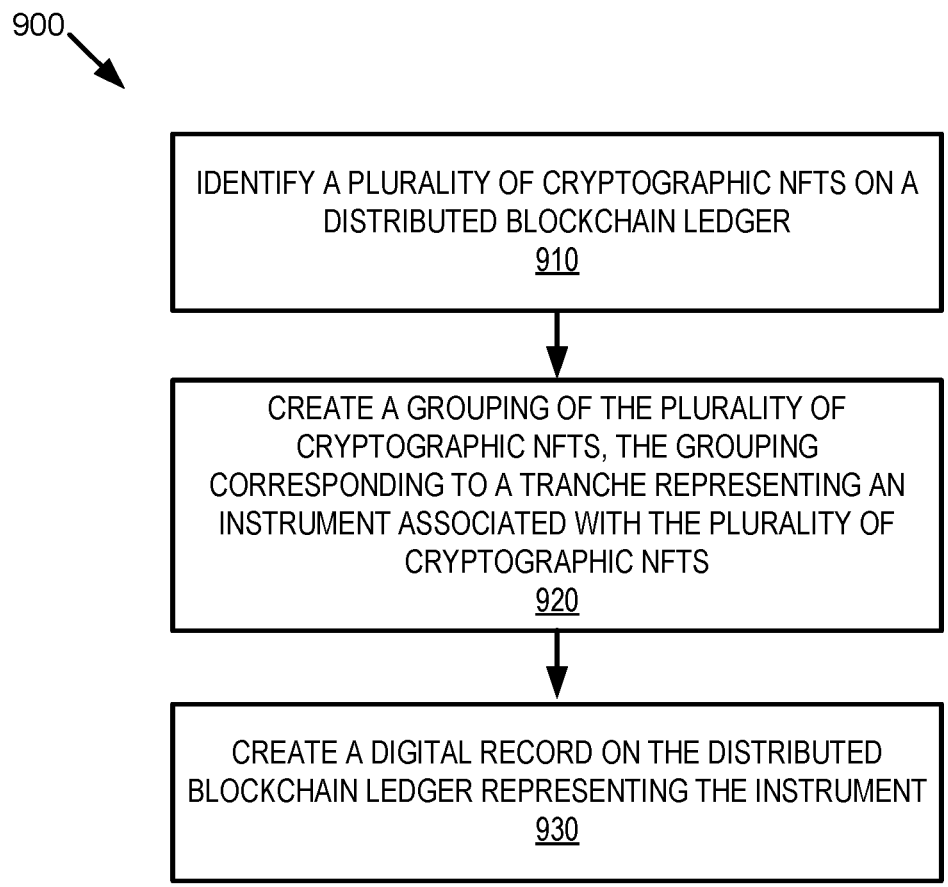
FIG. 9 is a flow diagram of a method for creating a digital record representing a tranche in a distributed blockchain ledger, in accordance with one or more aspects of the disclosure.

Turning to FIGS. 7-9, example flowcharts are illustrated that contain example operations implemented by example embodiments described herein. The operations illustrated in FIGS. 7, 8, and 9 may, for example, be performed by administration device 120 of the system architectures 100, 200, 300 (described previously with reference to FIGS. 1, 2, 3A, 3B, and 4), which may in turn be embodied by an apparatus 500, which is shown and described in connection with FIG. 5. To perform the operations described below, the apparatus 500 may utilize one or more of processing device 160, memory 170, network hardware 180, instrument administration circuitry 510, and/or any combination thereof. It will be understood that user interaction with the administration device 120 may occur directly via network hardware 180, or may instead be facilitated by similar or equivalent physical componentry facilitating such user interaction.

FIG. 7 is a flow diagram of a method 700 for securitizing cryptographic NFTs of a blockchain, in accordance with one or more aspects of the disclosure.

As shown by operation 710, the apparatus 500 includes means, such as processing device 160, memory 170, network hardware 180, instrument administration circuitry 510, or the like, for identifying a plurality of cryptographic NFTs on a distributed blockchain ledger. In some embodiments, the cryptographic NFT and the distributed blockchain ledger may be similar to the NFT 138 and blockchain 150, respectively, discussed herein with respect to FIGS. 1, 2, 3A, 3B, and 4.

As shown by operation 720, the apparatus 500 includes means, such as processing device 160, memory 170, network hardware 180, instrument administration circuitry 510, or the like, for associating an instrument with the plurality of cryptographic NFTs. In some embodiments, the instrument may be similar to instrument 168 discussed herein with respect to FIGS. 1, 2, 3A, 3B, and 4. In some embodiments, the plurality of cryptographic NFTs may be similar to the tranche 195 described herein with respect to FIGS. 1, 2, 3A, 3B, and 4.

As shown by operation 730, the apparatus 500 includes means, such as processing device 160, memory 170, network hardware 180, instrument administration circuitry 510, or the like, for determining a value of the plurality of cryptographic NFTs based on transactions on the distributed blockchain ledger that are associated with one or more of the plurality of cryptographic NFTs. In some embodiments, the transactions may be represented by transaction data 132 of a block 155 of the blockchain 150 described herein with respect to FIGS. 1, 2, 3A, 3B, and 4. In some embodiments, the value may be represented by the value 268 described herein with respect to FIGS. 1, 2, 3A, 3B, and 4.

As shown by operation 740, the apparatus 500 includes means, such as processing device 160, memory 170, network hardware 180, instrument administration circuitry 510, or the like, for monitoring the distributed blockchain ledger to detect transaction data of a block of the distributed blockchain ledger, the transaction data indicative of a transaction associated with a first cryptographic NFT of the plurality of cryptographic NFTs. In some embodiments, the transaction data may be similar to the transaction data 132 described herein with respect to FIGS. 1, 2, 3A, 3B, and 4. In some embodiments, the transaction associated with the first cryptographic NFT of the plurality of cryptographic NFTs may refer to a transaction such as a purchase of the first cryptographic NFT (e.g., a change of ownership) or other transaction associated with the first cryptographic NFT on the blockchain 150.

As shown by operation 750, the apparatus 500 includes means, such as processing device 160, memory 170, network hardware 180, instrument administration circuitry 510, or the like, for determining a modified value of the plurality of cryptographic NFTs responsive to the detection of the transaction data. In some embodiments, the modified value may be represented by the modified value 268' described herein with respect to FIG. 3B. In some embodiments, determining the modified value of the plurality of cryptographic NFTs responsive to the detection of the transaction data may include determining a normalized value of the first cryptographic NFT based on a duration between the transaction data of the block and prior transaction data associated with the first cryptographic NFT. In some embodiments, determining the modified value of the plurality of cryptographic NFTs may be performed at periodic intervals.

As shown by operation 760, the apparatus 500 includes means, such as processing device 160, memory 170, network hardware 180, instrument administration circuitry 510, or the like, for terminating the instrument associated with the plurality of cryptographic NFTs in response to a comparison of the modified value to a predetermined threshold value indicating that the modified value is less than the predetermined threshold value. In some embodiments, the predetermined threshold value may be represented by the upper cutoff value described herein with respect to FIG. 4.

In some embodiments, the method 700 may further include creating a digital record on the distributed blockchain ledger representing the instrument associated with the plurality of cryptographic NFTs. In some embodiments, the digital record may be similar to the NFT 138 created in association with an instrument 168, as described herein with respect to FIG. 2. In some embodiments, the digital record comprises metadata associated with the instrument, the metadata comprising a plurality of risk characteristics of the instrument associated with the plurality of cryptographic NFTs. In some embodiments, the plurality of risk characteristics include a term of the instrument, a premium payment associated with the instrument, an upper cutoff value for the instrument, and a lower cutoff value for the instrument.

In some embodiments, the method 700 may further include determining a payment based on the modified value of the plurality of cryptographic NFTs and generating a transaction on the distributed blockchain ledger to represent the payment. In some embodiments, the payment may represent a transfer of cryptocurrency on the distributed blockchain ledger.

FIG. 8 is a flow diagram of a method 800 for generating a payment transaction based on the value of the plurality of cryptographic NFTs, in accordance with one or more aspects of the disclosure.

As shown by operation 810, the apparatus 500 includes means, such as processing device 160, memory 170, network hardware 180, instrument administration circuitry 510, or the like, for generating a current value of a plurality of cryptographic NFTs that are associated with an instrument, wherein the instrument comprises an upper cutoff value, a lower cutoff value, and a premium value. In some embodiments, the plurality of cryptographic NFTs may be similar to the tranche 195 of NFTs 138 of a blockchain 150, as described herein with respect to FIGS. 1 to 4. The instrument may be similar to instrument 168, which may be a financial instrument, as described herein with respect to FIGS. 1 to 4.

As shown by operation 820, the apparatus 500 includes means, such as processing device 160, memory 170, network hardware 180, instrument administration circuitry 510, or the like, for comparing the current value of the plurality of cryptographic NFTs to the upper cutoff value. In some embodiments, the current value of the plurality of cryptographic NFTs may be a sum of the current value of respective ones of the plurality of cryptographic NFTs. In some embodiments, the current value of a cryptographic NFT 138 may be based on transactions on the blockchain 150 associated with the cryptographic NFT 138. In some embodiments, the value of the cryptographic NFT 138 may be based on a defined number of sales of the cryptographic NFT 138 that are recorded on the blockchain 150, which may be determined based on transaction data 132 of a block 155 of the blockchain 150.

As shown by operation 830, the apparatus 500 includes means, such as processing device 160, memory 170, network hardware 180, instrument administration circuitry 510, or the like, for generating, responsive to the value of the plurality of cryptographic NFTs being less than the upper cutoff value, a payment transaction for the lesser of a difference between the current value and the upper cutoff value and a difference between the upper cutoff value and the lower cutoff value. In some embodiments, the payment transaction may be a transaction on the blockchain 150, such as a cryptocurrency transaction.

As shown by operation 840, the apparatus 500 includes means, such as processing device 160, memory 170, network hardware 180, instrument administration circuitry 510, or the like, for generating, responsive to the value of the plurality of cryptographic NFTs being equal to or greater than the upper cutoff value, a payment transaction for the premium value. In some embodiments, the payment transaction may be a transaction on the blockchain 150, such as a cryptocurrency transaction.

FIG. 9 is a flow diagram of a method 900 for creating a digital record representing a tranche in a distributed blockchain ledger, in accordance with one or more aspects of the disclosure.

As shown by operation 910, the apparatus 500 includes means, such as processing device 160, memory 170, network hardware 180, instrument administration circuitry 510, or the like, for identifying a plurality of cryptographic NFTs on a distributed blockchain ledger. In some embodiments, the plurality of cryptographic NFTs may be similar to the tranche 195 of NFTs 138 of a blockchain 150, as described herein with respect to FIGS. 1 to 4.

As shown by operation 920, the apparatus 500 includes means, such as processing device 160, memory 170, network hardware 180, instrument administration circuitry 510, or the like, for creating a grouping of the plurality of cryptographic NFTs, the grouping corresponding to a tranche representing an instrument associated with the plurality of cryptographic NFTs. In some embodiments, the tranche may be similar to tranche 195 discussed herein with respect to FIGS. 1-4. The instrument may be similar to instrument 168, which may be a financial instrument, as described herein with respect to FIGS. 1 to 4. In some embodiments, creating the grouping may include compiling information related to the individual cryptographic NFTs of the plurality of cryptographic NFTs, including identifying information, such as the unique identification numbers of the blocks of the blockchain corresponding to the individual cryptographic NFTs of the plurality of cryptographic NFTs.

As shown by operation 930, the apparatus 500 includes means, such as processing device 160, memory 170, network hardware 180, instrument administration circuitry 510, or the like, for creating a digital record on the distributed blockchain ledger representing the instrument. In some embodiments, the digital record may include metadata associated with the tranche representing the plurality of cryptographic NFTs. The metadata associated with the tranche may be similar to NFT metadata 135 of block 155D containing a NFT link 130, as discussed herein with respect to FIG. 2. In some embodiments, the NFT link 130 may refer to instrument data, such as instrument data 292 illustrated in FIG. 2. In some embodiments, the instrument data 292 may include risk characteristics associated with the instrument. For example, in some embodiments, the instrument data may include one or more of a term of the instrument, a premium payment associated with the instrument, an upper cutoff value for the instrument, or a lower cutoff value for the instrument.

FIGS. 7, 8, and 9 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations described above in connection with FIGS. 7-9 may be modified or further amplified. Furthermore, in some embodiments, additional optional operations may be included. Modifications, amplifications, or additions to the operations above may be performed in any order and in any combination.

Embodiments of the present disclosure may provide improved methods and apparatus for the securitization of NFTs, including the generations of tranches therefrom. By generating instruments based on NFTs, the instruments may be represented in a way that is transparent (e.g., may be audited by viewing the blockchain) and immutable (e.g., may not be changed once added to the blockchain). The use of the blockchain allows the instruments to be programmatically searched by accessing the blockchain in a way that is not currently possible. Moreover, embodiments of the present disclosure also provide for the representation of tranches on the blockchain using NFTs. Such representation of tranches allows for the tranche to be transparently accessible and allows for the individual products that make up the tranche to be traversed. This allows for the programmatic discovery of the elements of the tranche.

Embodiments of the present disclosure provide an improvement to the technology associated with blockchain processing, including the ability to securitize NFTs within a tranche. For example, the embodiments of the present disclosure reduce an amount of resources needed to track the inventory of a tranche and provide technical solutions that are not currently possible with respect to identifying elements of a tranche, including their details. Transitioning to instruments that are based on NFTs, including the use of an NFT to represent the instrument, also provides an opportunity for standardization of the protocol for the management of financial instruments. For example, since the interfaces to create NFTs are known and standardized, the underlying structure of the securitized products and/or tranches can also be standardized, allowing for easier searching and management. Furthermore, an NFT-based approach enables better regulatory oversight and assists in providing clarity into how risk and instruments are allocated within a given tranche. Accordingly, the present disclosure sets forth systems, methods, and apparatuses that accommodates the tranching of NFTs into various financial instruments and improves the management of financial instruments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
identifying a plurality of cryptographic non-fungible tokens (NFTs) on a distributed blockchain ledger;
associating, by instrument administration circuitry, an instrument with the plurality of cryptographic NFTs;
determining, by the instrument administration circuitry, a value of the plurality of cryptographic NFTs based on one or more sets of transaction data on the distributed blockchain ledger that are associated with one or more of the plurality of cryptographic NFTs;
monitoring, by the instrument administration circuitry, the distributed blockchain ledger to detect transaction data of a block of the distributed blockchain ledger, the transaction data indicative of a transaction associated with a first cryptographic NFT of the plurality of cryptographic NFTs;
automatically determining, by the instrument administration circuitry, a modified value of the plurality of cryptographic NFTs responsive to detection of the transaction data;
automatically terminating the instrument associated with the plurality of cryptographic NFTs in response to a comparison of the modified value to a predetermined threshold value indicating that the modified value is less than the predetermined threshold value; and creating a digital record on the distributed blockchain ledger representing the instrument associated with the plurality of cryptographic NFTs, wherein the digital record comprises metadata associated with the instrument, the metadata comprising a plurality of risk characteristics of the instrument associated with the plurality of cryptographic NFTs.

2. The method of claim 1, wherein the plurality of risk characteristics comprises one or more of a term of the instrument, a premium payment associated with the instrument, an upper cutoff value for the instrument, or a lower cutoff value for the instrument.

3. The method of claim 1, wherein automatically determining the modified value of the plurality of cryptographic NFTs responsive to the detection of the transaction data comprises determining a normalized value of the first cryptographic NFT based on a duration between the transaction data of the block and prior transaction data associated with the first cryptographic NFT.

4. The method of claim 1, wherein automatically determining the modified value of the plurality of cryptographic NFTs is performed at periodic intervals.

5. The method of claim 1, further comprising:
determining a payment based on the modified value of the plurality of cryptographic NFTs; and
generating a transaction within a block of the distributed blockchain ledger to represent the payment.

6. The method of claim 1, wherein the plurality of risk characteristics comprises an upper cutoff value for the instrument.

7. An apparatus comprising an instrument administration circuitry, the instrument administration circuitry comprising:
a memory; and
a processing device, operatively coupled to the memory, to:
identify a plurality of cryptographic non-fungible tokens (NFTs) on a distributed blockchain ledger;
associate an instrument with the plurality of cryptographic NFTs;
determine a value of the plurality of cryptographic NFTs based on one or more sets of transaction data on the distributed blockchain ledger that are associated with one or more of the plurality of cryptographic NFTs;
monitor the distributed blockchain ledger to detect transaction data of a block of the distributed blockchain ledger, the transaction data indicative of a transaction associated with a first cryptographic NFT of the plurality of cryptographic NFTs;
automatically determine a modified value of the plurality of cryptographic NFTs responsive to the detection of the transaction data;
automatically terminate the instrument associated with the plurality of cryptographic NFTs in response to a comparison of the modified value to a predetermined threshold value indicating that the modified value is less than the predetermined threshold value; and
create a digital record on the distributed blockchain ledger representing the instrument associated with the plurality of cryptographic NFTs, wherein the digital record comprises metadata associated with the instrument, the metadata comprising a plurality of risk characteristics of the instrument associated with the plurality of cryptographic NFTs.

8. The apparatus of claim 7, wherein the plurality of risk characteristics comprises one or more of a term of the instrument, a premium payment associated with the instrument, an upper cutoff value for the instrument, or a lower cutoff value for the instrument.

9. The apparatus of claim 7, wherein, to automatically determine the modified value of the plurality of cryptographic NFTs responsive to the detection of the transaction data, the processing device is to determine a normalized value of the first cryptographic NFT based on a duration between the transaction data of the block and prior transaction data associated with the first cryptographic NFT.

10. The apparatus of claim 7, wherein the processing device is to automatically determine the modified value of the plurality of cryptographic NFTs at periodic intervals.

11. The apparatus of claim 7, wherein the processing device is further to:
determine a payment based on the modified value of the plurality of cryptographic NFTs; and
generate a transaction within a block of the distributed blockchain ledger to represent the payment.

12. A non-transitory computer-readable storage medium comprising instructions that, when executed by a processing device, cause the processing device to:
identify a plurality of cryptographic non-fungible tokens (NFTs) on a distributed blockchain ledger;
associate an instrument with the plurality of cryptographic NFTs;
determine a value of the plurality of cryptographic NFTs based on one or more sets of transaction data on the distributed blockchain ledger that are associated with one or more of the plurality of cryptographic NFTs;
monitor the distributed blockchain ledger to detect transaction data of a block of the distributed blockchain ledger, the transaction data indicative of a transaction associated with a first cryptographic NFT of the plurality of cryptographic NFTs;
automatically determine a modified value of the plurality of cryptographic NFTs responsive to the detection of the transaction data;
automatically terminate the instrument associated with the plurality of cryptographic NFTs in response to a comparison of the modified value to a predetermined threshold value indicating that the modified value is less than the predetermined threshold value; and
create a digital record on the distributed blockchain ledger representing the instrument associated with the plurality of cryptographic NFTs, wherein the digital record comprises metadata associated with the instrument, the metadata comprising a plurality of risk characteristics of the instrument associated with the plurality of cryptographic NFTs.

13. The non-transitory computer-readable storage medium of claim 12, wherein the plurality of risk characteristics comprises one or more of a term of the instrument, a premium payment associated with the instrument, an upper cutoff value for the instrument, or a lower cutoff value for the instrument.

14. The non-transitory computer-readable storage medium of claim 12, wherein, to automatically determine the modified value of the plurality of cryptographic NFTs responsive to the detection of the transaction data, the processing device is to determine a normalized value of the first cryptographic NFT based on a duration between the transaction data of the block and prior transaction data associated with the first cryptographic NFT.

15. The non-transitory computer-readable storage medium of claim 12, wherein the instructions, when executed by the processing device, further cause the processing device to:
- determine a payment based on the modified value of the plurality of cryptographic NFTs; and
- generate a transaction within a block of the distributed blockchain ledger to represent the payment.

* * * * *